(12) United States Patent
Hinds et al.

(10) Patent No.: US 12,501,118 B2
(45) Date of Patent: Dec. 16, 2025

(54) INDEPENDENT MAPPING SPACE FOR ASSET INTERCHANGE USING ITMF

(71) Applicant: TENCENT AMERICA LLC, Palo Alto, CA (US)

(72) Inventors: Arianne Hinds, Palo Alto, CA (US); Paul Spencer Dawkins, Garland, TX (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 5 days.

(21) Appl. No.: 18/405,431

(22) Filed: Jan. 5, 2024

(65) Prior Publication Data
US 2024/0236443 A1    Jul. 11, 2024

Related U.S. Application Data

(60) Provisional application No. 63/438,208, filed on Jan. 10, 2023, provisional application No. 63/437,983, filed on Jan. 9, 2023, provisional application No. 63/437,961, filed on Jan. 9, 2023.

(51) Int. Cl.
*H04N 21/81* (2011.01)
(52) U.S. Cl.
CPC .............................. *H04N 21/8146* (2013.01)
(58) Field of Classification Search
CPC .................................................. H04N 21/8146
See application file for complete search history.

(56) References Cited

U.S. PATENT DOCUMENTS

| | | | |
|---|---|---|---|
| 2018/0027223 A1 | 1/2018 | Seo et al. | |
| 2019/0028691 A1 | 1/2019 | Hinds et al. | |
| 2019/0104326 A1* | 4/2019 | Stockhammer | .... H04N 21/6377 |
| 2021/0392386 A1 | 12/2021 | Hinds | |
| 2021/0409818 A1* | 12/2021 | Bouazizi | ................ H04N 21/84 |
| 2022/0335694 A1* | 10/2022 | Bouazizi | ................ G06F 3/011 |
| 2022/0337919 A1* | 10/2022 | Yip | .................. H04N 21/23412 |

OTHER PUBLICATIONS

Idea, ITMF Scene Graph Specification 0.9 Public Draft, Oct. 8, 2019 (Year: 2019).*
International Search Report dated Apr. 18, 2024 in Application No. PCT/US24/10662.
Written Opinion of the International Searching Authority dated Apr. 18, 2024 in App. No. PCT/US24/10662.

\* cited by examiner

*Primary Examiner* — Mulugeta Mengesha
(74) *Attorney, Agent, or Firm* — Sughrue Mion, PLLC

(57) ABSTRACT

There is included a method and apparatus including computer code configured to cause a processor or processors to parse a scene file to extract scene file data, send the scene file data to a converter, and translate, by the converter and based on a metadata framework, the scene file data from a first scene graph format to a second scene graph format compatible with a renderer interface, and the metadata framework comprises an organization of metadata into at least one of systems and subsystems of the systems comprising collections of information common across a plurality of scene graph formats, and the metadata is specified in an Immersive Technologies Media Format.

14 Claims, 22 Drawing Sheets

INDEPENDENT MAPPING SPACE FOR ASSET INTERCHANGE USING ITMF

CROSS REFERENCE TO RELATED APPLICATION

The present application claims priority to each of provisional application U.S. 63/437,961, filed on Jan. 9, 2023, provisional application U.S. 63/437,983, filed on Jan. 9, 2023, and provisional application 63/438,208, filed on Jan. 10, 2023, which are hereby expressly incorporated by reference, in their entireties, into the present application.

BACKGROUND

1. Field

The present disclosure describes embodiments generally related to architectures, structures and components for systems and networks that distribute media, including video, audio, geometric (3D) objects, haptics, associated metadata, or other content for a client device. Particular embodiments are directed systems, structures, and architectures for distribution of media content to heterogeneous immersive and interactive client devices.

2. Description of Related Art

"Immersive Media" generally refers to media that stimulates any or all human sensory systems (visual, auditory, somatosensory, olfactory, and possibly gustatory) to create or enhance the perception of the user being physically present in the experience of the media, i.e., beyond what is distributed over existing (e.g., "legacy") commercial networks for timed two-dimensional (2D) video and corresponding audio; such timed media also being known as "legacy media".

Yet another definition for "immersive media" is media that attempt to create, or imitate the physical world through digital simulation of kinetics and laws of physics, thereby stimulating any or all human sensory systems so as to create the perception by the user of being physically present inside a scene that depicts a real or virtual world.

Immersive media-capable presentation devices may refer to devices equipped with sufficient resources and capabilities to access, interpret, and present immersive media. Such devices are heterogeneous in terms of the quantities and formats of the media that they may support in terms of media provided by a network. Likewise, media are heterogeneous in terms of the amount and types of network resources required to distribute such media at scale. "At scale" may refer to the distribution of media by service providers that achieve distribution equivalent to that of legacy video and audio media over networks, e.g., Netflix, Hulu, Comcast subscriptions, and Spectrum subscriptions.

In contrast, legacy presentation devices such as laptop displays, televisions, and mobile handset displays are homogenous in their capabilities because these devices are currently comprised of rectangular display screens that consume frame-based 2D rectangular video or still images as their primary visual media formats. Some of the frame-based visual media formats commonly used in legacy presentation devices may include High Efficiency Video Coding/H.265, Advanced Video Coding/H.264, and Versatile Video Coding/H.266, for video media.

The term "frame-based" media refers to the characteristic that the visual media are comprised of one or more consecutive rectangular frames of imagery. In contrast, "scene-based" media refers to visual media that are organized by "scenes" in which each scene refers to individual assets that collectively describe the visual scene.

A comparative example between frame-based and scene-based visual media is illustrated in the case of visual media illustrating a forest. In the frame-based representation, the forest is captured using camera devices such as those provided on mobile phones. The user enables the camera to focus on the forest and the frame-based media that is captured by the phone is the same as what the user sees through the camera viewport provided on the phone, including any movement of the camera initiated by the user. The resulting frame-based representation of the forest is the series of 2D images that are recorded by the camera usually at a standard rate of 30 frames-per-second or 60 frames-per-second. Each image is a collection of pixels where the information stored in each pixel is congruent, one pixel to the next.

In contrast, a scene-based representation of a forest is comprised of individual assets that describe each of the objects in the forest, and a human-readable scene graph description that presents a myriad of metadata that describe the assets or how the assets are to be rendered. For example, the scene-based representation may include individual objects called "trees" where each tree is comprised of a collection of smaller assets called "trunks," "branches," and "leaves." Each tree trunk may be further described individually by a mesh that describes the full 3D geometry of the trunk and a texture that is applied to the tree-trunk mesh to capture the color and radiance properties of the trunk. Furthermore, the trunk may be accompanied by additional information that describes the surface of the trunk in terms of its smoothness or roughness or ability to reflect light. The corresponding human-readable scene graph description may provide information as to where to place the tree trunks relative to the viewport of a virtual camera that is focused into the forest scene. Furthermore the human-readable description may include information as to how many branches to generate and where to place them into the scene from the single branch asset called "branch." Likewise the description may include how many leaves to generate and the position of the leaves relative to the branches and the tree trunks. Moreover, a transformation matrix may provide information as to how to scale or rotate the leaves so that the leaves do not appear homogenous. Overall, the individual assets that comprise the scene vary in terms of the type and quantities of information that is stored in each asset. Each asset is usually stored in its own file, but often the assets are used to create multiple instances of the objects that they are designed to create, e.g., the branches and leaves for each tree.

Those that are skilled in the art may appreciate that the human-readable portion of a scene graph is rich in metadata to not only describe the relationships of assets to their position within the scene, but also instructions as to how to render the object, e.g., with various types of light sources, or with surface properties (to indicate the object has a metallic vs. matte surface) or other materials (poreous or smooth texture). Other information often stored in the human readable portion of the graph is the relationship of assets with other assets, e.g., to form groups of assets that are rendered or handled as a single entity, e.g., the tree trunks with branches and leaves.

Examples of scene graphs with human readable components include glTF 2.0 where the node-tree component is provided in Jave Script Object Notation (JSON) which is a human-readable notation to describe objects. Another example of a scene graph with a human readable component is the Immersive Technologies Media Format (ITMF—most recent version is version 2.0) in which the OCS file is generated using XML, another human-readable notation format. The ITMF is currently specified in a suite of specifications comprised of three specifications including: the ITMF Scene Graph, ITMF Container, and ITMF Data Encoding specifications.

The ITMF Scene Graph Specification specifies the scene graph description format which is stored in an "OCS" file, and its corresponding nodes, pins (e.g., input and output parameters for nodes), and attributes (characteristics of nodes that are generally immutable). The ITMF Container Specification specifies the binary representations, encryption mechanisms, and organization design used to package the scene graph OCS file and the corresponding assets for the scene. The ITMF Data Encoding Specification provides the numerical identifiers, i.e., code points, used to organize the types of nodes, pins, attributes, and other relevant information describing the structure of the scene.

Yet another difference between scene-based and frame-based media is that in frame-based media the view that is created for the scene is identical to the view that the user captured via the camera, i.e., at the time that the media was created. When the frame-based media is presented by a client, the view of the media that is presented is the same as the view that is captured in the media, e.g., by the camera that was used to record the video. With scene-based media, however, there may be multiple ways for the user to view the scene using a variety of virtual camera, e.g., a thin-lens camera vs. a panoramic camera.

The distribution of any media over networks may employ media delivery systems and architectures that reformat the media from an input or network "ingest" media format to a distribution media format where that distribution media format is not only suitable to be ingested by the targeted client device and its applications, but is also conducive to being "streamed" over the network. Thus there may be two processes that are performed upon the ingested media by the network: 1) converting the media from a format A into a format B that is suitable to be ingested by the target client, i.e., based upon the client's capabilities to ingest certain media formats, and 2) preparing the media to be streamed.

"Streaming" of media broadly refers to the fragmenting and or packetizing of the media so that it can be delivered over the network in consecutive smaller-sized "chunks" logically organized and sequenced according to either or both the media's temporal or spatial structure. "Transforming," which is sometimes referred to as "transcoding," of media from a format A to a format B may be a process that is performed, usually by the network or by the service provider, prior to distributing the media to the client. Such transcoding may be comprised of converting the media from a format A to a format B based upon prior knowledge that format B is somehow a preferred format, or the only format, that can be ingested by the target client, or is better suited for distribution over a constrained resource such as a commercial network. In many cases, but not all, both steps of transforming the media and preparing the media to be streamed are necessary before the media can be received and processed by the client from the network.

The above one or two-step processes acted upon the ingested media by the network, i.e., prior to distributing the media to the client, results in a media format referred to as a "distribution media format," or simply, the "distribution format." In general, these steps should be performed only once, if performed at all for a given media data object, if the network has access to information to indicate that the client will need the transformed and or streamed media object for multiple occasions that otherwise would trigger the transformation and streaming of such media multiple times. That is, the processing and transfer of data for transformation and streaming of media is generally regarded as a source of latency with the requirement for expending potentially significant amount of network and or compute resources. Hence, a network design that does not have access to information to indicate when a client potentially already has a particular media data object stored in its cache or stored locally with respect to the client, will perform suboptimally to a network that does have access to such information.

For legacy presentation devices, the distribution format may be equivalent or sufficiently equivalent to the "presentation format" ultimately used by the client presentation device to create the presentation. That is, a presentation media format is a media format whose properties (resolution, framerate, bit-depth, colour gamut, etc, . . . ) are closely tuned to the capabilities of the client presentation device. Some examples of distribution vs. presentation formats include: a High-Definition (HD) video signal (1920 pixel columns×1080 pixel rows) distributed by a network to an Ultra-high-definition (UHD) client device with resolution (3840 pixel columns×2160 pixel rows). In this scenario, the UHD client will apply a process called "super-resolution" to the HD distribution format to increase the resolution of the video signal from HD to UHD. Thus the final signal format that is presented by the client device is the "presentation format" which, in this example, is a UHD signal, whereas the HD signal comprises the distribution format. In this example, the HD signal distribution format is very similar to the UHD signal presentation format because both signals are in a rectilinear video format, and the process to convert the HD format to a UHD format is a relatively straightforward and easy process to perform on most legacy client devices.

Alternatively, the preferred presentation format for the targeted client device may be significantly different from the ingest format received by the network. Nevertheless, the client may have access to sufficient compute, storage, and bandwidth resources to transform the media from the ingest format into the necessary presentation format suitable for presentation by the client. In this scenario, the network may bypass the step of reformatting the ingested media, e.g. "transcoding" the media, from a format A to a format B simply because the client has access to sufficient resources to perform all media transforms without the network having to do so a priori. However, the network may still perform the step of fragmenting and packaging the ingest media so that the media may be streamed to the client.

Yet another alternative is that the ingested media received by the network is significantly different from the client's preferred presentation format, and the client does not have access to sufficient compute, storage, and or bandwidth resources to convert the media to the preferred presentation format. In such a scenario, the network may assist the client by performing some or all of the transformation from the ingest format into a format that is either equivalent or nearly equivalent to the client's preferred presentation format on behalf of the client. In some architecture designs, such assistance provided by the network on behalf of the client is commonly referred to as "split rendering" or "adaptation" of the media.

Given each of scenarios where transformations of media from a format A to another format may be done either entirely by the network, entirely by the client, or jointly between both the network and the client, e.g., for split rendering, it becomes apparent that a lexicon of attributes that describe a media format may be needed so that both the client and network have complete information to characterize the media and the work that must be done. Furthermore, a lexicon that provides attributes of a client's capabilities, e.g., in terms of available compute resources, available storage resources, and access to bandwidth may likewise be needed. Even further, a mechanism to characterize the level of compute, storage, or bandwidth complexity of an ingest format is needed so that a network and client may jointly, or singely, determine if or when the network may employ a split-rendering step for distributing the media to the client. Additionally, if the transformation and or streaming of a particular media object that is or will be needed by the client to complete the presentation has already been done as part of the work to process prior scenes for the presentation, then the network might altogether skip the steps of transform and or streaming of the ingest media assuming that the client still has access or availability to the media that was previously streamed to the client. Finally, if the transformation from a Format A to another format is determined to be a necessary step to be performed either by or on behalf of the client, then a prioritization scheme for ordering the transformation processes of individual assets within the scene may benefit an intelligent and efficient network architecture.

One example of such a lexicon of attributes to characterize the media is the so-called Independent Mapping Space (IMS) nomenclature that is designed to help translate from one scene-graph format to another, and potentially entirely different, scene-graph format. The Independent Mapping Space is to be defined in Part 28 of the ISO/IEC 23090 suite of standards; such suite is informally known as "MPEG-I." According to the scope of Part 28, the IMS is comprised of metadata and other information that describe commonly used aspects of scene-based media formats. For example, scene-based media may commonly provide mechanisms to describe the geometry of a visual scene. One aspect of the IMS in ISO/IEC 23090 Part 28 is to provide standards-based metadata that may be used to annotate the human-readable portion of a scene graph so that the annotation guides the translation from one format to another, i.e. from one scene geometry description to another scene geometry description. Such annotation may also be attached to the scene graph as a separate binary component. The same guided translation may be true of cameras; i.e., many scene graph formats provide a means to describe the features of a virtual camera that can be used as part of the rendering process to create a viewport into the scene. The IMS in Part 28 likewise is intended to provide metadata to describe commonly used camera types. The purpose of the IMS is to provide a nomenclature that can be used to describe the commonly-used aspects across multiple scene graph formats, so that the translation from one format to another is guided by the IMS. Such a translation enables asset interchange across multiple clients.

Another important aspect of ISO/IEC 23090 Part 28 is that there is intentionally no specified way to complete the translation from one format to another format. Rather, the IMS simply provides guidance for how to characterize common features of all scene graphs. Apart from the geometry and camera features of a scene graph, other common features of scenes include lighting, and object surface properties such as albedo, materials, roughness, and smoothness.

With respect to the goal of translating one scene graph format X to another scene graph format Y, there are at least two potential problems to solve as follows. A first problem is to define a generic translation between two representations of the same type of media object, media attribute, or rendering function to be performed. For example, the IMS metadata for a static mesh object may be expressed with a generic code such as: IMS_STATIC_MESH. A scene graph represented by the syntax of format X may refer to a static mesh using an identifier such as: FORMAT_X_STATIC_MESH, whereas a scene graph represented by the syntax of format Y may refer to a static mesh using an identifier such as: FORMAT_Y_STATIC_MESH. The definition of a generic translation via the use of the IMS in ISO/IEC 23090 Part 28 may include the mappings of FORMAT_X_STATIC_MESH to IMS_STATIC_MESH, and FORMAT_Y_STATIC_MESH to IMS_STATIC_MESH. Hence, a generic translation from format X static mesh to format Y static mesh may be facilitated through the use of the metadata IMS_STATIC_MESH from IMS of ISO/IEC 23090 Part 28.

It is important to note that at the time of this disclosure, the first version of Part 28 is still being developed by ISO/IEC JTC1 SC29/WG7 (MPEG's Working Group 7). The most recent version of the specification published by WG7 is ISO/IEC JTC1/SC29 WG7 N00439, which was published by WG7 on 18 Dec. 2022. Document N00439 does not provide a full specification of the Independent Mapping Space (IMS), in particular with respect to the goal of establishing a standards-based set of metadata to enable interchange of scene graphs.

A second problem to address in a translation process is to annotate the individual objects and other parts of the scene graph for a specific instance of a scene graph, e.g., a scene graph representation using format X, with the metadata comprising the IMS. That is, the metadata used to annotate a specific instance of a scene graph should be directly related to the corresponding individual media objects, media attributes, and rendering features of the scene graph format X.

With respect to the above problem of defining metadata to facilitate a translation from one scene graph format to another, one approach is to leverage the availability of unique code points that are defined within the ITMF suite of specifications to create an Independent Mapping space such as planned in the ongoing development of ISO/IEC 23090 Part 28. Such a space serves to facilitate media interchange from one format to another while preserving or closely preserving the information represented by the different media formats.

Within the ITMF specifications, nodes, node pins, and node attributes that are essential to the coding of an ITMF scene are mostly organized into systems of nodes related to the function that they serve for the coding of an ITMF. One exception to this ITMF organization is that nodes that are essential to describe the structure of the scene itself are not so organized. That is, within the ITMF, groups of nodes that are related to geometry, materials, textures, and so on, are organized into specific groups according to the purpose that they serve. However, nodes that serve only to provide information concerning how the scene is organized are not thusly organized. Essentially, the organization of the unique code points available in the ITMF suite of specifications should not be used directly to determine an organization of systems of metadata for an independent mapping space such as the one endeavored for ISO/IEC 23090 Part 28.

Therefore, there is a desire for a technical solution to such problems.

SUMMARY

To address one or more different technical problems, this disclosure provides technical solutions to reduce network overhead and server computational overheads while delivering immersive video with respect to one or more viewport margin updates according to exemplary embodiments.

To address one or more different technical problems, there is included a method and apparatus comprising memory configured to store computer program code and a processor or processors configured to access the computer program code and operate as instructed by the computer program code. The computer program code includes parsing code configured to cause the at least one processor to parse a scene file to extract scene file data, sending code configured to cause the at least one processor to send the scene file data to a converter, and translating code configured to cause the at least one processor to translate, by the converter and based on a metadata framework, the scene file data from a first scene graph format to a second scene graph format compatible with a renderer interface, and the metadata framework includes an organization of metadata into at least one of systems and subsystems of the systems comprising collections of information common across a plurality of scene graph formats, and the metadata is specified in an Immersive Technologies Media Format.

The organization of the metadata may include a subclause specifying node names, definitions of the node names, and labels comprising a Graph Types Nodes System within an Independent Mapping Space.

The node names may include a "scene graph" node, a "geometry archive" node, a "project settings" node, and a "scripted graph" node.

The definitions of the node names may include a "sceneGraph" definition, describing a scene, a "geometry Archive" definition, describing a geometric object, a "projectSettings", definition describing default settings, and a "scriptedGraph" definition, describing a script.

The node names of the subclause of the metadata may consist of and be, in the subclause, in order of the "scene graph" node, the "geometry archive" node, the "project settings" node, and the "scripted graph" node.

The subclause may be absent code points.

The organization of the metadata may include a subclause specifying node names and labels comprising a Renderer Instruction Nodes System within an Independent Mapping Space.

The node names may include a "camera imager" node, a "render target" node, a "post processing" node, a "render passes" node, a "render layer" node, an "animation settings" node, and a "film settings" node.

The node names of the subclause of the metadata may consist of and be, in the subclause, in order of the "camera imager" node, the "render target" node, the "post processing" node, the "render passes" node, the "render layer" node, the "animation settings" node, and the "film settings" node.

The subclause may include code points.

BRIEF DESCRIPTION OF THE DRAWINGS

Further features, nature, and various advantages of the disclosed subject matter will be more apparent from the following detailed description and the accompanying drawings in which.

DETAILED DESCRIPTION

Figure 1:
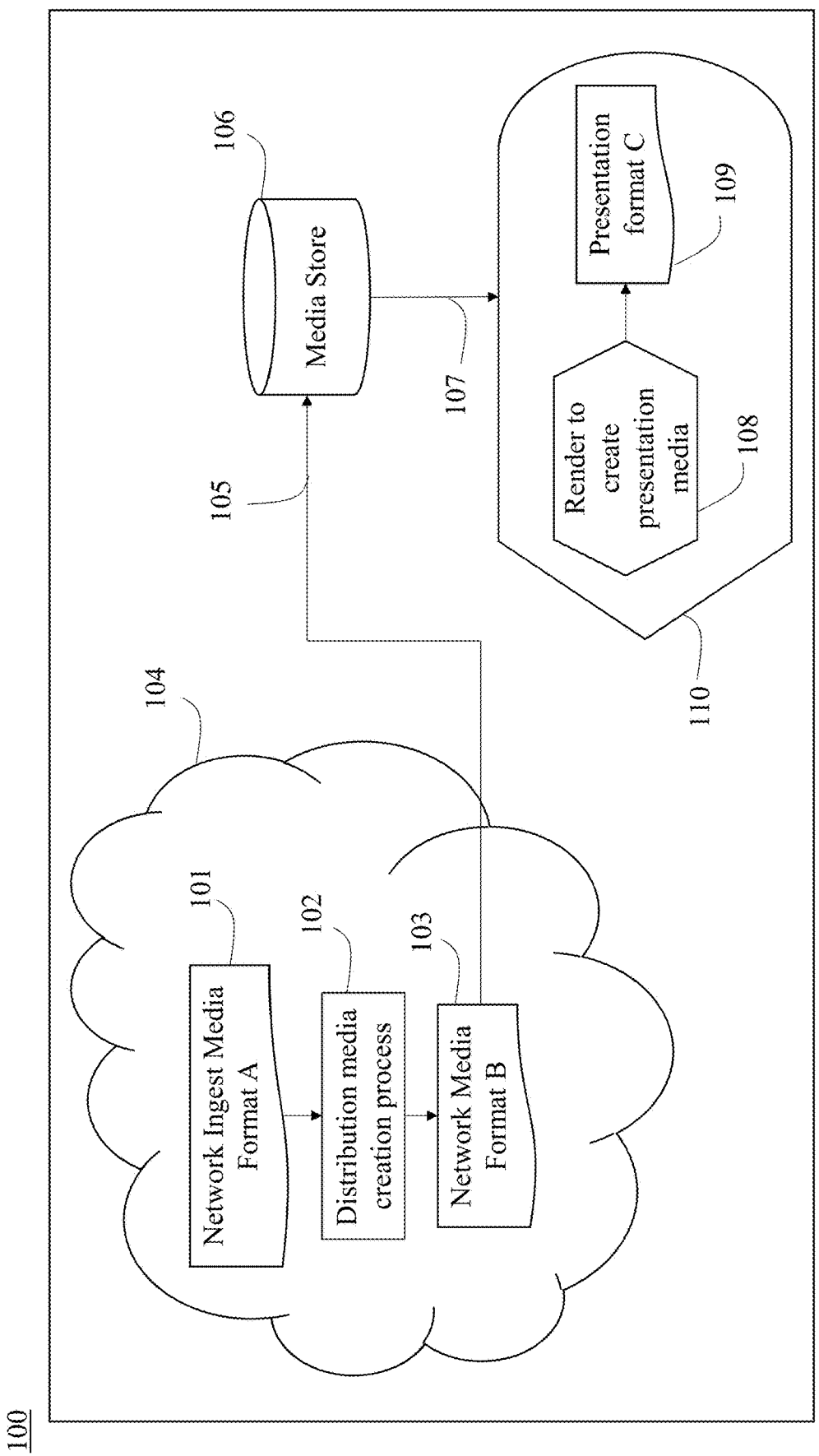
FIG. 1 is a schematic illustration of the flow of media through a network for distribution to a client according to exemplary embodiments.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Definitions

Scene graph: general data structure commonly used by vector-based graphics editing applications and modern computer games, which arranges the logical and often (but not necessarily) spatial representation of a graphical scene; a collection of nodes and vertices in a graph structure.

Scene: in the context of computer graphics, a scene is a collection of objects (e.g., 3D assets), object attributes, and other metadata that comprise the visual, acoustic, and physics-based characteristics describing a particular setting that is bounded either by space or time with respect to the interactions of the objects within that setting.

Node: fundamental element of the scene graph comprised of information related to the logical or spatial or temporal representation of visual, audio, haptic, olfactory, gustatory, or related processing information; each node shall have at most one output edge, zero or more input edges, and at least one edge (either input or output) connected to it.

Base Layer: a nominal representation of an asset, usually formulated to minimize the compute resources or time needed to render the asset, or the time to transmit the asset over a network.

Enhancement Layer: a set of information that when applied to the base layer representation of an asset, augments the base layer to include features or capabilities that are not supported in the base layer.

Attribute: metadata associated with a node used to describe a particular characteristic or feature of that node either in a canonical or more complex form (e.g. in terms of another node).

Binding LUT: a logical structure that associates metadata from the IMS of ISO/IEC 23090 Part 28 with metadata or other mechanisms used to describe features or functions of a specific scene graph format, e.g. ITMF, gITF, Universal Scene Description.

Container: a serialized format to store and exchange information to represent all natural, all synthetic, or a mixture of synthetic and natural scenes including a scene graph and all of the media resources that are required for rendering of the scene Serialization: the process of translating data structures or object state into a format that can be stored (for example, in a file or memory buffer) or transmitted (for example, across a network connection link) and reconstructed later (possibly in a different computer environment). When the resulting series of bits is reread according to the serialization format, it can be used to create a semantically identical clone of the original object.

Renderer: a (typically software-based) application or process, based on a selective mixture of disciplines related to: acoustic physics, light physics, visual perception, audio perception, mathematics, and software development, that, given an input scene graph and asset container, emits a typically visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g. repackaged into another container i.e. used in a series of rendering processes in a graphics pipeline); for audio-based media assets, a renderer may emit an audio signal for presentation in a multi-channel loudspeaker and/or binauralized headphones, or for repackaging into another (output) container. Popular examples of renderers include the real-time rendering features of the game engines Unity and Unreal Engine.

Evaluate: produces a result (e.g. similar to evaluation of a Document Object Model for a webpage) that causes the output to move from an abstract to a concrete result.

Scripting language: An interpreted programming language that can be executed by a renderer at runtime to process dynamic input and variable state changes made to the scene graph nodes, which affect rendering and evaluation of spatial and temporal object topology (including physical forces, constraints, inverse kinematics, deformation, collisions), and energy propagation and transport (light, sound).

Shader: a type of computer program that was originally used for shading (the production of appropriate levels of light, darkness, and color within an image) but which now performs a variety of specialized functions in various fields of computer graphics special effects or does video post-processing unrelated to shading, or even functions unrelated to graphics at all.

Path Tracing: a computer graphics method of rendering three-dimensional scenes such that the illumination of the scene is faithful to reality.

Timed media: Media that is ordered by time; e.g., with a start and end time according to a particular clock.

Untimed media: Media that is organized by spatial, logical, or temporal relationships; e.g., as in an interactive experience that is realized according to the actions taken by the user(s).

Neural Network Model: a collection of parameters and tensors (e.g., matrices) that define weights (i.e., numerical values) used in well defined mathematical operations applied to the visual signal to arrive at an improved visual output which may include the interpolation of new views for the visual signal that were not explicitly provided by the original signal.

OCS: The human-readable portion of an ITMF scene graph that uses unique identifiers denoted as 'id=nnn' where 'nnn' is an integer value.

IMS: Independent Mapping Space metadata that is standardized in ISO/IEC 23090 Part 28.

Pin: input and output parameters for nodes of a scene graph

Attributes: characteristics of a given node that are immutable by other nodes.

In the last decade, a number of immersive media-capable devices have been introduced into the consumer market, including head-mounted displays, augmented-reality glasses, hand-held controllers, multi-view displays, haptic gloves, and game consoles. Likewise, holographic displays and other forms of volumetric displays are poised to emerge into the consumer market within the next three to five years. Despite the immediate or imminent availability of these devices, a coherent end-to-end ecosystem for the distribution of immersive media over commercial networks has failed to materialize for several reasons.

One of the impediments to realizing a coherent end-to-end ecosystem for distribution of immersive media over commercial networks is that the client devices that serve as end-points for such a distribution network for immersive displays are all very diverse. Some of them support certain immersive media formats while others do not. Some of them are capable of creating an immersive experience from legacy raster-based formats, while others cannot. Unlike a network designed only for distribution of legacy media, a network that must support a diversity of display clients needs a significant amount of information pertaining to the specifics of each of the client's capabilities, and the formats of the media to be distributed, before such network can employ an adaptation process to translate the media into a format suitable for each target display and corresponding application. At a minimum, such a network would need access to information that directly describes the characteristics of each target display and of the media itself in order to ascertain interchange of the media. That is, media information may be represented differently depending on how the media is organized according to a variety of media formats; a network that supports heterogeneous clients and immersive media formats would need access to information that enables it to identify when one or more media representations (according to specifications of media formats) are essentially representing the same media information. Thus a major challenge for distribution of heterogeneous media to heterogeneous client end points is to achieve media "interchange."

Media interchange can be regarded as the preservation of a property of the media after the media has been converted (or adapted as described above in the conversion from a Format A to a Format B). That is, the information represented by a Format A is either not lost or is closely approximated by a representation by Format B.

Immersive media may be organized into "scenes" that are described by scene graphs, which are also known as scene descriptions. To date, there are a number of popular scene-based media formats including: FBX, USD, Alembic, and gITF.

Such scenes refer to scene-based media as described above. The scope of a scene graph is to describe visual, audio, and other forms of immersive assets that comprise a particular setting that is part of a presentation, for example, the actors and events taking place in a particular location in a building that is part of a presentation, e.g., movie. A list of all scenes that comprise a single presentation may be formulated into a manifest of scenes.

The disclosed subject matter addresses the need for an embodiment of an Independent Mapping Space, i.e., to address the requirements and goals (to achieve media interchange) for ISO/IEC 23090 Part 28 (currently still in development). Such an embodiment is comprised of a collection of "subsystems" in which each subsystem is comprised of related nodes, pins, and attributes commonly used to represent scene-based media. In general, each subsystem is organized in a manner similar to the organization of nodes within the ITMF with the exception of nodes related to information that describes the explicit organization of scene graph. There is currently no corresponding ITMF subsystem of nodes that explicitly defines the organization of the ITMF graph. The subject matter disclosed herein creates such a subsystem in order to define a complete collection of subsystems for the framework comprising IMS metadata for the purposes of immersive media interchange.

Note that the remainder of the disclosed subject matter assumes, without loss of generality, that the process of adapting (i.e., to achieve media interchange) an input immersive media source to match the input media requirements for a specific end-point client device is the same as, or similar to, the process of adapting the same input immersive media source to the specific application that is being executed on the specific client end-point device. That is, the problem of adapting an input media source to the characteristics of an end-point device are of the same complexity as the problem to adapt a specific input media source to the characteristics of a specific application.

Further note that the term media object and media asset may be used interchangeably, both referring to a specific instance of a specific format of media data.

FIG. 1 is a schematic illustration of a Media Flow Process 100 of media, through a network, for distribution to a client. In FIG. 1, processing of an Ingest Media Format A is performed by a "cloud" or edge process 104. Note that the same processing may be performed a priori in a manual process or by a client, just as well. Ingest Media 101 is obtained from a content provider. Process 102 performs any necessary transformations or conditioning of the ingested media to create a potentially alternative representation of the media as a Distribution Format B. Media formats A and B may or may not be representations following the same syntax of a particular media format specification, however the Format B is likely to be conditioned by Process 103 into a scheme that facilitates the distribution of the media over a network protocol such as TCP or UDP. Such "streamable" media is depicted in 105 as media that is streamed to a Media Store 106. Client 110 accesses the media from Store 106 via a Fetching Mechanism 107 (e.g. ISO/IEC 23009 Dynamic Adaptive Streaming over HTTP). Client 110 has access to some rendering capabilities depicted as 108. Such render capabilities 108 may be rudimentary or likewise, sophisticated, depending on the type of client 110 that is being targeted. Render process 108 creates Presentation Media 109 that may or may not be represented according to a third format specification, e.g., Format C.

Figure 2:
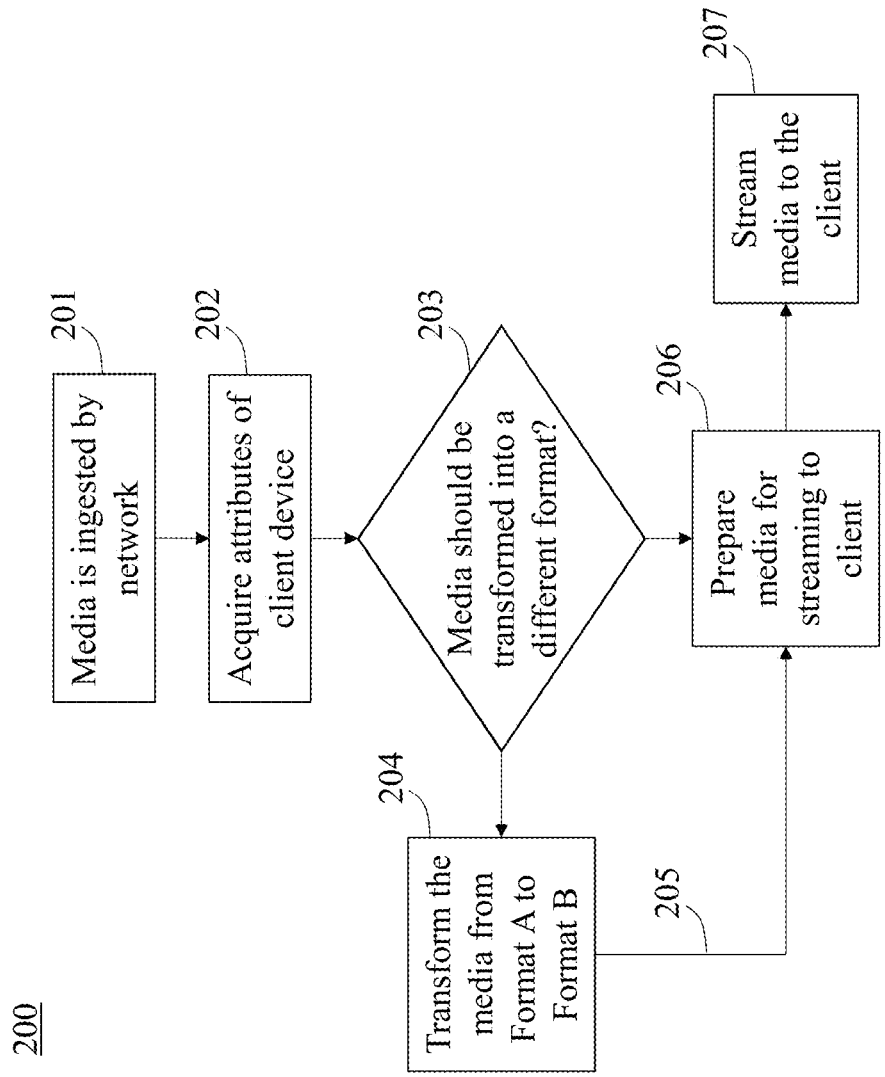
FIG. 2 is a schematic illustration of the flow of media through a network in which a decision making process is employed to determine if the network should transform the media prior to distributing the media to the client according to exemplary embodiments.

FIG. 2 is a schematic illustration of a flow of media through a network in which a Media Transform Decision Making Process 200 is employed to determine if the network should transform the media prior to distributing the media to a client. In FIG. 2, Ingest Media 201 represented in Format A is provided by a content provider to the network. Process 202 acquires attributes that describe the processing capabilities of targeted client (not depicted). Decision making process 203 is employed to determine if the network or the client should perform any format conversions for any of the media assets contained within the Ingested Media 201, e.g., such as a conversion of a particular media object from a Format A to a Format B, prior to the media being streamed to the client. If any of the media assets should be transformed by the network, then the network employs process 204 to transform the media object from Format A to Format B. Transformed media 205 is the output from process 204. The transformed media is merged into the Preparation process 206 to prepare the media to be streamed to client (not shown). Process 207 streams the media to the client or to the media store (e.g., Media Store 106 in FIG. 1).

Figure 3:
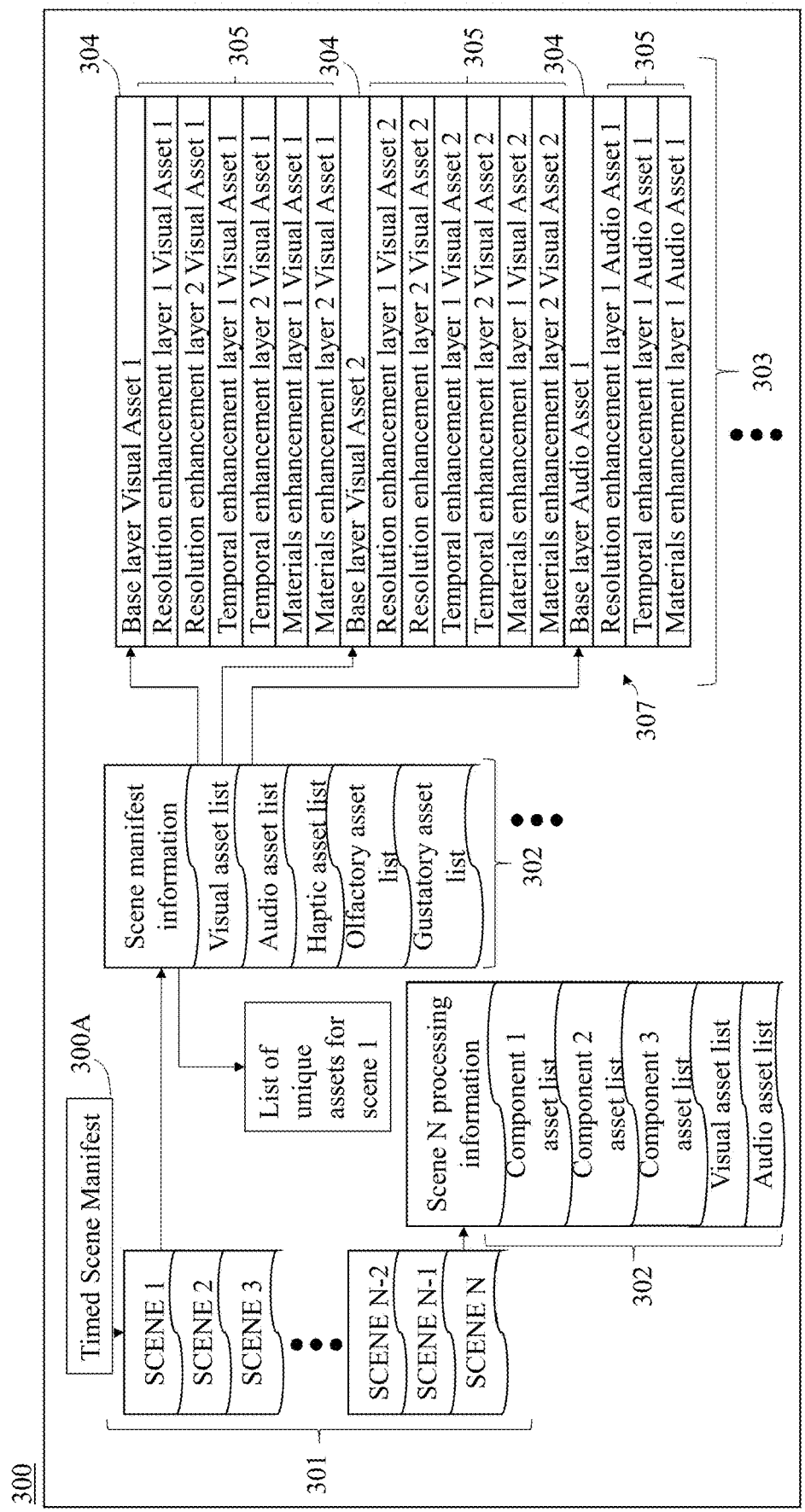
FIG. 3 is a schematic illustration of an embodiment of a data-model for the representation and streaming of timed immersive media where such timed immersive media contains lists of assets that are reused across a set of N scenes according to exemplary embodiments.
Figure 4:
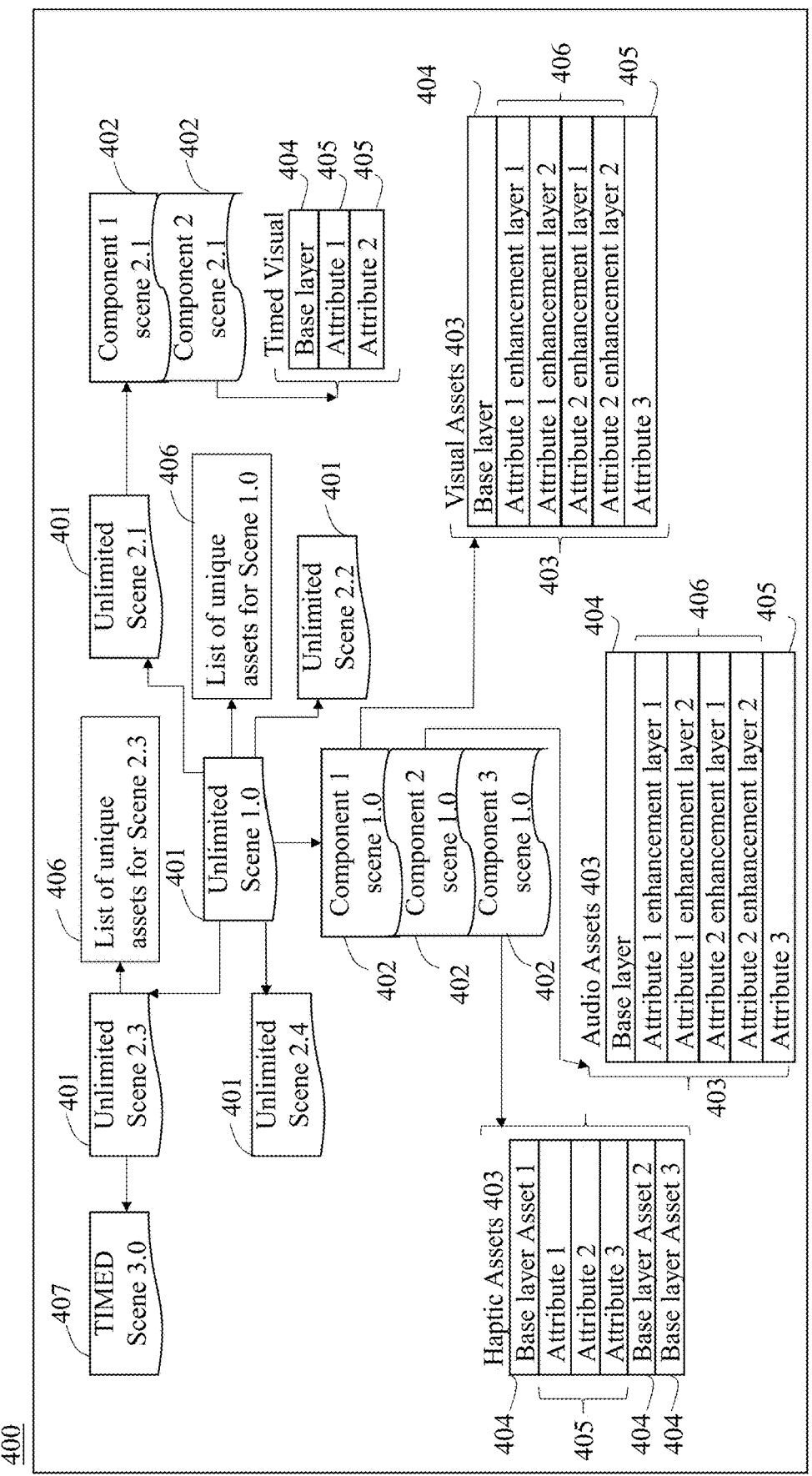
FIG. 4 is a schematic illustration of an embodiment of a data-model for the representation and streaming of untimed immersive media where such untimed immersive media contains lists of assets that are reused across a set of 5 scenes according to exemplary embodiments.

FIG. 3 depicts a Timed Media Representation 300 as an example representation of a streamable format for heterogenous immersive media that is timed. FIG. 4 depicts an Untimed Media Representation 400 as an example representation of a streamable format for heterogeneous immersive media that is untimed. Both figures refer to a Scene; FIG. 3 refers to Scene 301 for timed media and FIG. 4 refers to Scene 401 for untimed media. For both cases, the Scene may be embodied by various scene representations, or scene descriptions.

For example, in some immersive media designs, a scene may be embodied by a Scene Graph, or as a Multi-Plane Image (MPI), or as a Multi-Spherical Image (MSI). Both the MPI and MSI techniques are examples of technologies that aid in the creation of display-agnostic scene representations for natural content, i.e., images of the real world captured simultaneously from one or more cameras. Scene Graph technologies, on the other hand, may be employed to represent both natural and computer-generated imagery in the form of synthetic representations, however, such representations are especially compute-intensive to create for the case when the content is captured as natural scenes by one or more cameras. That is, scene graph representations of naturally-captured content are both time and compute-intensive to create, requiring complex analysis of natural images with techniques of photogrammetry or deep learning or both, in order to create synthetic representations that can subsequently be used to interpolate sufficient and adequate numbers of views to fill a target immersive client display's viewing frustum. As a result, such synthetic representations are presently impractical to consider as candidates for representing natural content, because they cannot practically be created in real-time for consideration of use cases that require real-time distribution. Nevertheless, at present, the best candidate representations for computer generated imagery is to employ the use of a scene graph with synthetic models, as computer generated imagery is created using 3D modeling processes and tools.

Such a dichotomy in optimal representations of both natural and computer generated content suggests that the optimal ingest format for naturally-captured content is different from the optimal ingest format for computer generated content or for natural content that is not essential for real-time distribution applications. Therefore, the disclosed subject matter targets to be robust enough to support multiple ingest formats for visually immersive media, whether they are created naturally through the use of physical cameras or by a computer.

The following are example technologies that embody scene graphs as a format suitable for representing visual immersive media that is created using computer generated techniques, or naturally captured content for which deep learning or photogrammetry techniques are employed to create the corresponding synthetic representations of a natural scene, i.e., not essential for real-time distribution applications.

1. ORBX by OTOY

ORBX by OTOY is one of several scene graph technologies that is able to support any type of visual media, timed or untimed, including ray-traceable, legacy (frame-based), volumetric, and other types of synthetic or vector-based visual formats. ORBX is unique from other scene graphs because ORBX provides native support for freely available and/or open source formats for meshes, point clouds, and textures. ORBX is a scene graph that has been intentionally designed with the goal of facilitating interchange across multiple vendor technologies that operate on scene graphs. Moreover, ORBX provides a rich materials system, support for Open Shader Language, a robust camera system, and support for Lua Scripts. ORBX is also the basis of the Immersive Technologies Media Format published for license under royalty-free terms by the Immersive Digital Experiences Alliance (IDEA). In the context of real time distribution of media, the ability to create and distribute an ORBX representation of a natural scene is a function of the availability of compute resources to perform a complex analysis of the camera-captured data and synthesis of the same data into synthetic representations. To date, the availability of sufficient compute for real-time distribution is not practical, but nevertheless, not impossible.

2. Universal Scene Description by Pixar

Universal Scene Description (USD) by Pixar is another well-known, and mature scene graph that is popular in the VFX and professional content production communities. USD is integrated into Nvidia's Omniverse platform which is a set of tools for developers for 3D model creation and rendering with Nvidia's GPUs. A subset of USD was published by Apple and Pixar as USDZ. USDZ is supported by Apple's ARKit.

3. glTF2.0 by Khronos glTF2.0 is the most recent version of the "Graphics Language Transmission Format" specification written by the Khronos 3D Group. This format supports a simple scene graph format that is generally capable of supporting static (untimed) objects in scenes, including "png" and "jpeg" image formats. glTF2.0 supports simple animations, including support for translate, rotate, and scale, of basic shapes described using the glTF primitives, i.e. for geometric objects. glTF2.0 does not support timed media, and hence does not support video nor audio.

4. ISO/IEC 23090 Part 14 Scene Description is an Extension of glTF2.0 that Adds Support for Timed Media, e.g., Video and Audio.

These known designs for scene representations of immersive visual media are provided for example only, and do not limit the disclosed subject matter in its ability to specify a process to adapt an input immersive media source into a format that is suitable to the specific characteristics of a client end-point device.

Moreover, any or all of the above example media representations either currently employ or may employ deep learning techniques to train and create a neural network model that enables or facilitates the selection of specific views to fill a particular display's viewing frustum based on the specific dimensions of the frustum. The views that are chosen for the particular display's viewing frustum may be interpolated from existing views that are explicitly provided in the scene representation, e.g., from the MSI or MPI techniques, or they may be directly rendered from render engines based on specific virtual camera locations, filters, or descriptions of virtual cameras for these render engines.

The disclosed subject matter is therefore robust enough to consider that there is a relatively small but well known set of immersive media ingest formats that is sufficiently capable to satisfy requirements both for real-time or "on-demand" (e.g., non-real-time) distribution of media that is either captured naturally (e.g., with one or more cameras) or created using computer generated techniques.

Interpolation of views from an immersive media ingest format by use of either neural network models or network-based render engines is further facilitated as advanced network technologies such as 5G for mobile networks, and fibre optical cable for fixed networks are deployed. That is, these advanced network technologies increase the capacity and capabilities of commercial networks because such advanced network infrastructures can support transport and delivery of increasingly larger amounts of visual information. Network infrastructure management technologies such as Multi-access Edge Computing (MEC), Software Defined Networks (SDN), and Network Functions Virtualization (NFV), enable commercial network service providers to flexibly configure their network infrastructure to adapt to changes in demand for certain network resources, e.g., to respond to dynamic increases or decreases in demand for network throughputs, network speeds, roundtrip latency, and compute resources. Moreover, this inherent ability to adapt to dynamic network requirements likewise facilitates the ability of networks to adapt immersive media ingest formats to suitable distribution formats in order to support a variety of immersive media applications with potentially heterogenous visual media formats for heterogenous client end-points.

Immersive Media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client end-point display that is consuming the data. In general, any consumer-facing application may be supported by a variety of client end-points with various onboard-client capabilities for storage, compute, and power, and likewise various requirements for particular media representations.

The disclosed subject matter therefore enables a sufficiently equipped network, i.e., a network that employs some or all of the characteristics of a modern network, to simultaneously support a plurality of legacy and immersive media-capable devices according to features that are specified within that:
1. Provide flexibility to leverage media ingest formats that are practical for both real-time and "on demand" use cases for the distribution of media.
2. Provide flexibility to support both natural and computer generated content for both legacy and immersive-media capable client end-points.
3. Support both timed and untimed media.
4. Provide a process for dynamically adapting a source media ingest format to a suitable distribution format based on the features and capabilities of the client end-point, as well as based on the requirements of the application.
5. Ensure that the distribution format is streamable over IP-based networks.
6. Enable the network to simultaneously serve a plurality of heterogenous client end-points that may include both legacy and immersive media-capable devices and applications.
7. Provide an exemplary media representation framework that facilitates the organization of the distribution media along scene boundaries.

An end-to-end embodiment of the improvements enabled by the disclosed subject matter is achieved according to the processing and components described in the detailed description of FIGS. 3 through 16 as follows.

FIG. 3 and FIG. 4 both employ a single exemplary encompassing distribution format that has been adapted from an ingest source format to match the capabilities of a specific client end-point. As described above, the media that is shown in FIG. 3 is timed and the media that is shown in FIG. 4 is untimed. The specific encompassing format is robust enough in its structure to accommodate a large variety of media attributes where each may be layered based on the amount of salient information that each layer contributes to the presentation of the media. Note that such a layering process is already a well-known technique in the current state-of-the-art as demonstrated with Progressive JPEG and scalable video architectures such as those specified in ISO/IEC 14496-10 (Scalable Advanced Video Coding).

1. The media that is streamed according to the encompassing media format is not limited to legacy visual and audio media, but may include any type of media information that is capable of producing a signal that interacts with machines to stimulate the human senses for sight, sound, taste, touch, and smell.
2. The media that is streamed according to the encompassing media format can be both timed or untimed media, or a mixture of both.
3. The encompassing media format is furthermore streamable by enabling a layered representation for media objects by use of a base layer and enhancement layer architecture. In one example, the separate base layer and enhancement layers are computed by application of multi-resolution or multi-tessellation analysis techniques for media objects in each scene. This is analogous to the progressively rendered image formats specified in ISO/IEC 10918-1 (JPEG), and ISO/IEC 15444-1 (JPEG2000), but not limited to raster-based visual formats. In an example embodiment, a progressive representation for a geometric object could be a multi-resolution representation of the object computed using wavelet analysis.

In another example of the layered representation of the media format, the enhancement layers apply different attributes to the base layer, such as refining the material properties of the surface of a visual object that is represented by the base layer. In yet another example, the attributes may refine the texture of the surface of the base layer object, such as changing the surface from a smooth to a porous texture, or from a matted surface to a glossy surface.

In yet another example of the layered representation, the surfaces of one or more visual objects in the scene may be altered from being Lambertian to being ray-traceable.

In yet another example of the layered representation, the network will distribute the base-layer representation to the client so that the client may create a nominal presentation of the scene while the client awaits the transmission of additional enhancement layers to refine the resolution or other characteristics of the base representation.

4. The resolution of the attributes or refining information in the enhancement layers is not explicitly coupled with the resolution of the object in the base layer as it is today in existing MPEG video and JPEG image standards.
5. The encompassing media format supports any type of information media that can be presented or actuated by a presentation device or machine, thereby enabling the support of heterogeneous media formats to heterogeneous client end-points. In one embodiment of a network that distributes the media format, the network will first query the client end-point to determine the client's capabilities, and if the client is not capable of meaningfully ingesting the media representation then the network will either remove the layers of attributes that are not supported by the client, or adapt the media from its current format into a format that is suitable for the client end-point. In one example of such adaptation, the network would convert a volumetric visual media asset into a 2D representation of the same visual asset, by use of a Network-Based Media Processing protocol. In another example of such adaptation, the network may employ a neural network process to reformat the media to an appropriate format or optionally synthesize views that are needed by the client end-point.

6. The manifest for a complete or partially-complete immersive experience (live streaming event, game, or playback of on-demand asset) is organized by scenes which is the minimal amount of information that rendering and game engines can currently ingest in order to create a presentation. The manifest includes a list of the individual scenes that are to be rendered for the entirety of the immersive experience requested by the client. Associated with each scene are one or more representations of the geometric objects within the scene corresponding to streamable versions of the scene geometry. One embodiment of a scene representation refers to a low resolution version of the geometric objects for the scene. Another embodiment of the same scene refers to an enhancement layer for the low resolution representation of the scene to add additional detail, or increase tessellation, to the geometric objects of the same scene. As described above, each scene may have more than one enhancement layer to increase the detail of the geometric objects of the scene in a progressive manner.

7. Each layer of the media objects that are referenced within a scene is associated with a token (e.g., URI) that points to the address of where the resource can be accessed within the network. Such resources are analogous to CDN's where the content may be fetched by the client.

8. The token for a representation of a geometric object may point to a location within the network or to a location within the client. That is, the client may signal to the network that its resources are available to the network for network-based media processing.

FIG. 3 depicts a Timed Media Representation 300 including an embodiment of the encompassing media format for timed media as follows. The Timed Scene Manifest includes a list of Scenes 301. The Scene 301 refers to a list of Components 302 that separately describe processing information and types of media assets that comprise Scene 301. Components 302 refer to Assets 303 that further refer to Base Layers 304 and Attribute Enhancement Layers 305. A list of unique assets that have not been previously used in other scenes is provided in 307.

FIG. 4 depicts an Untimed Media Representation 400 including an embodiment of the encompassing media format for untimed media as follows. Information for Scene 401 is not associated with a start and end duration according to a clock. Scene 401 refers to a list of Components 402 that separately describe processing information and types of media assets that comprise Scene 401. Components 402 refer to Assets 403 that further refer to Base Layers 404 and Attribute Enhancement Layers 405 and 406. Furthermore, Scene 401 refers to other Scenes 401 that are for untimed media. Scene 401 also refers to Scene 407 that is for a timed media scene. Lists 406 identify unique assets associated with a particular scene that have not been previously used in higher order (e.g., parent) scenes.

Figure 5:
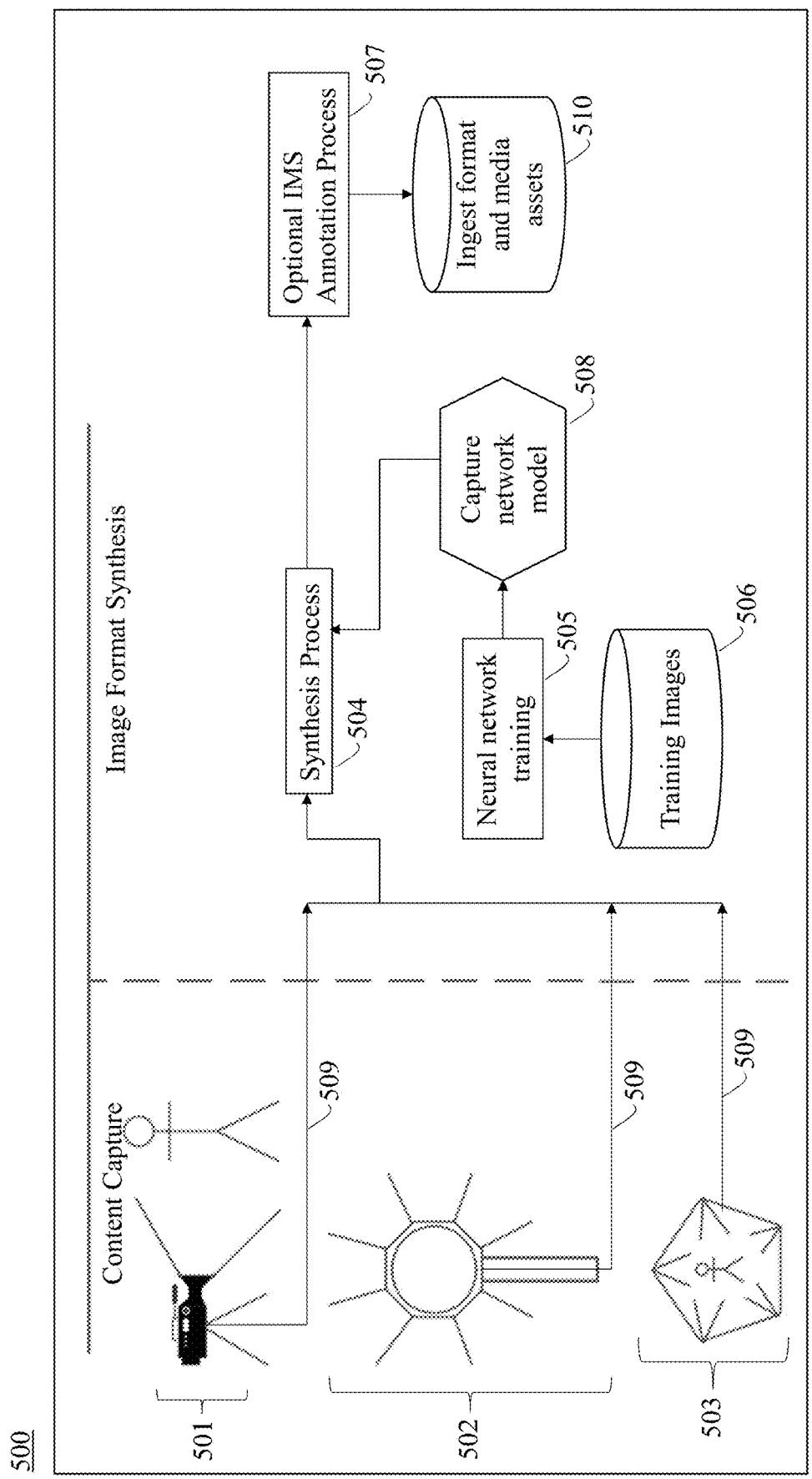
FIG. 5 is a schematic illustration of a process of capturing a natural scene and converting it to a representation that can be used as an ingest format for a network that serves heterogeneous client end-points according to exemplary embodiments.

FIG. 5 illustrates a sample embodiment of a Natural Media Synthesis Process 500 to synthesize an ingest format from natural content. Camera unit 501 uses a single camera lens to capture a scene of a person. Camera unit 502 captures a scene with five diverging fields of view by mounting five camera lenses around a ring-shaped object. The arrangement in 502 is an exemplary arrangement commonly used to capture omnidirectional content for VR applications. Camera unit 503 captures a scene with seven converging fields of view by mounting seven camera lenses on the inner diameter portion of a sphere. The arrangement 503 is an exemplary arrangement commonly used to capture light fields for light field or holographic immersive displays. Natural image content 509 is provided as input to Synthesis Process 504 that may optionally employ a Neural Network Training Process 505 using a collection of Training Images 506 to produce an optional Capture Neural Network Model 508. Another process commonly used in lieu of training process 505 is Photogrammetry. If model 508 is created during process 500 depicted in FIG. 5, then model 508 becomes one of the assets in the Ingest Format 510 for the natural content. Annotation Process 507 may optionally be performed to annotate scene-based media with IMS metadata. Exemplary embodiments of the Ingest Format 510 include MPI and MSI.

Figure 6:
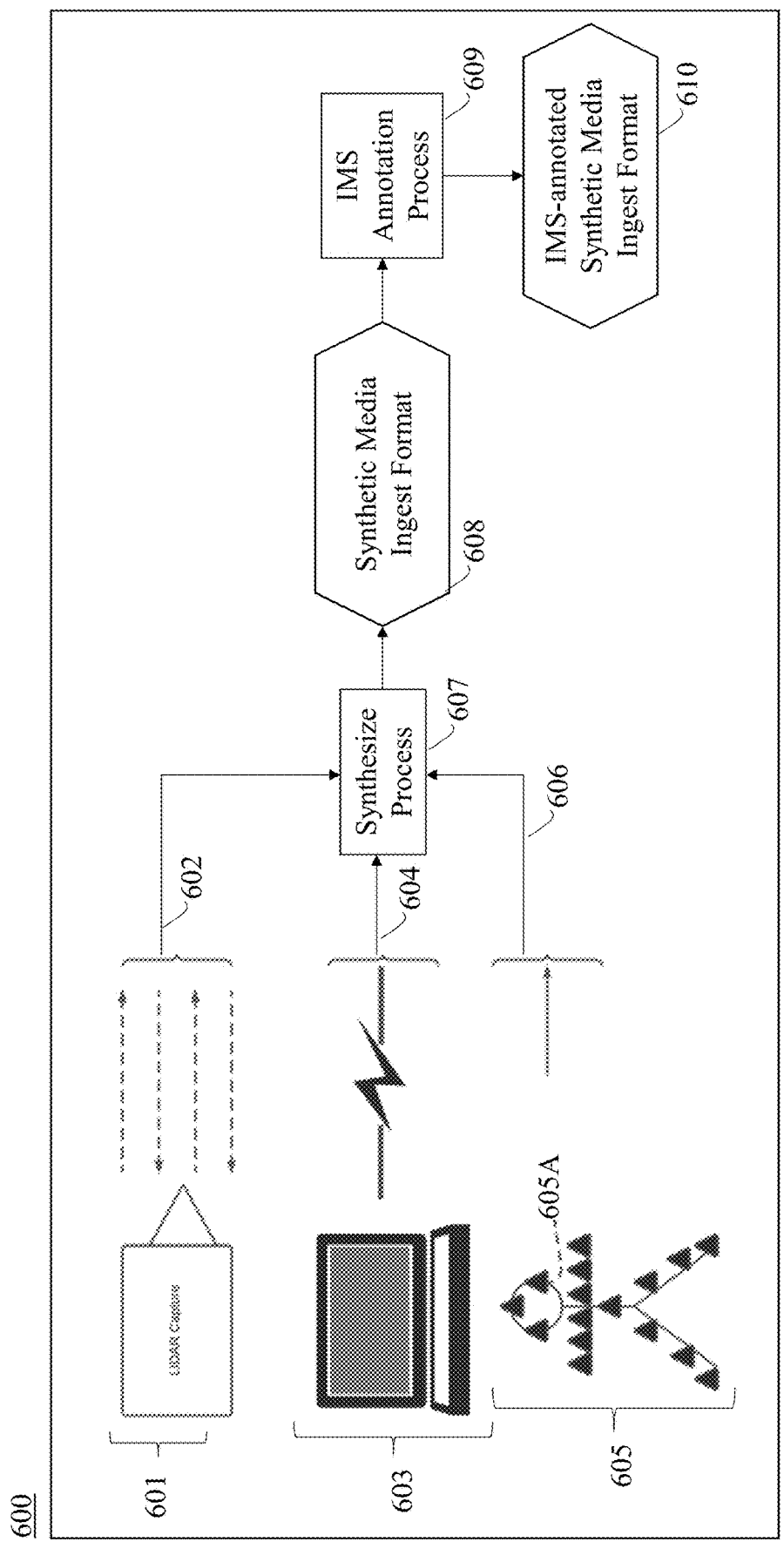
FIG. 6 is a schematic illustration of a process of using 3D modeling tools and formats to create a representation of a synthetic scene that can be used as an ingest format for a network that serves heterogeneous client end-points. In this example, the scene graph is optionally annotated with IMS metadata according to exemplary embodiments.

FIG. 6 illustrates an embodiment of a Synthetic Media Ingest Creation Process 600 to create an ingest format for synthetic media, e.g., computer-generated imagery. LIDAR Camera 601 captures Point Clouds 602 of scene. CGI tools, 3D modelling tools, or another animation processes to create synthetic content are employed on Computer 603 to create 604 CGI Assets over a network. Motion Capture Suit with Sensors 605A is worn on Actor 605 to capture a digital recording of the motion for actor 605 to produce animated MoCap Data 606. Data 602, 604, and 606 are provided as input to Synthesis Process 607 which outputs Synthetic Media Ingest Format 608. Format 608 may then be input into an optional IMS Annotation Process 609 whose output is IMS-annotated Synthetic Media Ingest Format 610.

The techniques for representing and streaming heterogeneous immersive media described above, can be implemented as computer software using computer-readable instructions and physically stored in one or more computer-readable media. For example, FIG. 7 depicts a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
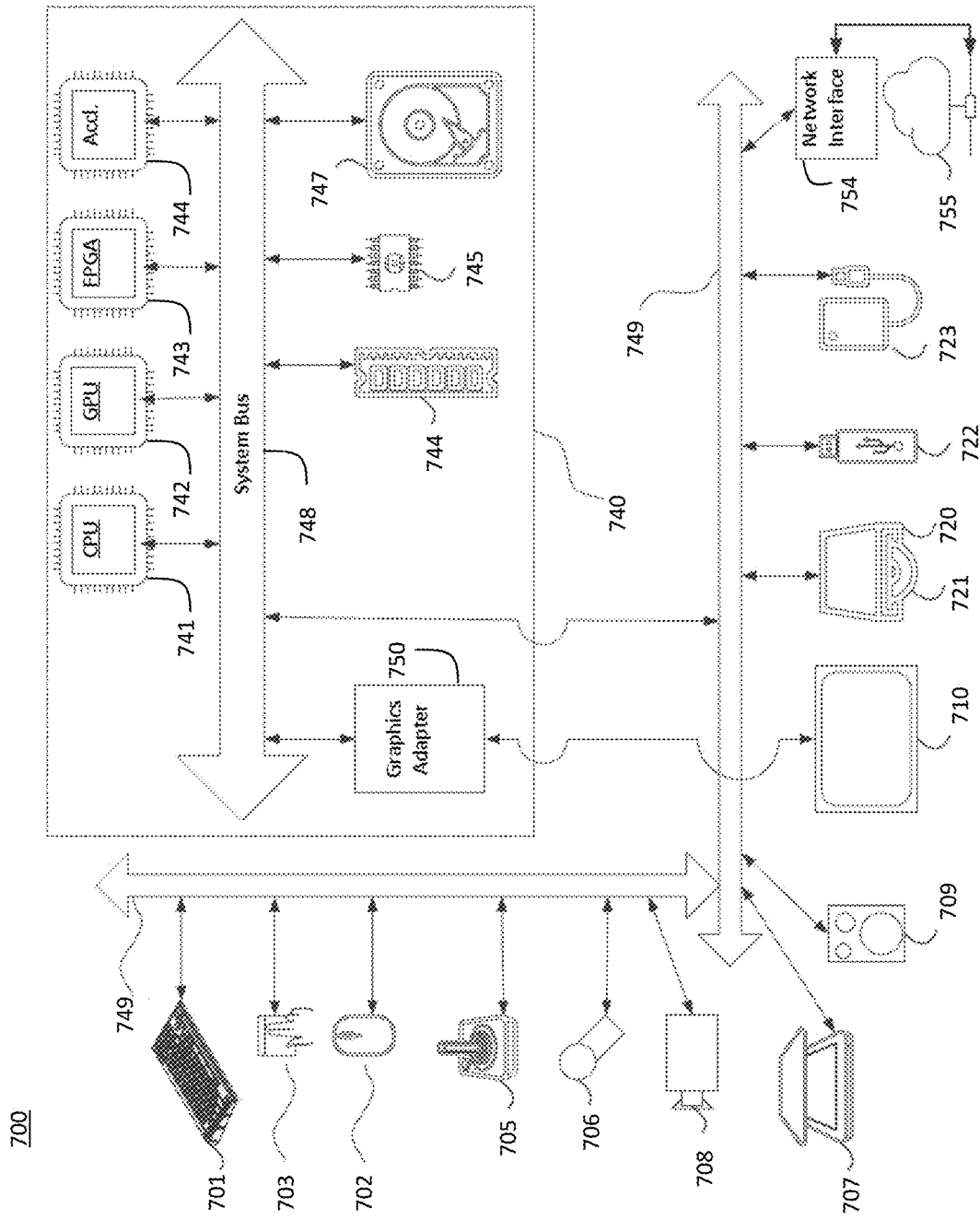
FIG. 7 is a system diagram of computer system according to exemplary embodiments.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of: keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove, or joystick 705, but there can also be tactile feedback devices that do not serve as input devices), audio output devices (such as: speakers 709, headphones, visual output devices (such as screens 710 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses, holographic displays and smoke tanks), and printers.

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc, specialized ROM/ASIC/PLD based devices such as security dongles, and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on.

Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer readable media can encompass a circuit (such as an integrated circuit (IC)) storing software for execution, a circuit embodying logic for execution, or both, where appropriate. The present disclosure encompasses any suitable combination of hardware and software.

Figure 8:
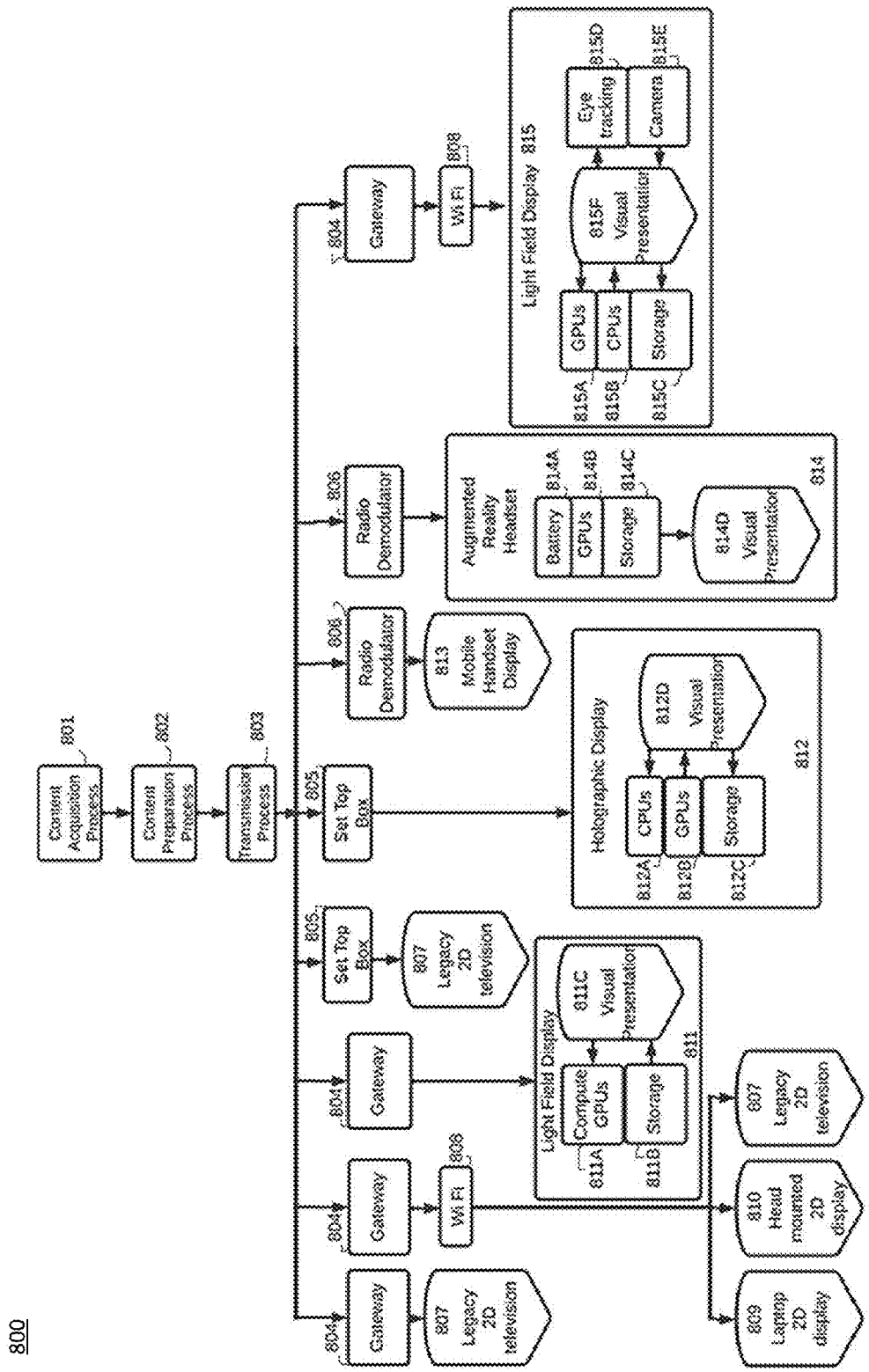
FIG. 8 is a schematic illustration of a network that serves a plurality of heterogeneous client end-points according to exemplary embodiments.

FIG. 8 illustrates an exemplary Network Media Distribution System 800 that supports a variety of legacy and heterogeneous immersive-media capable displays as client endpoints. Content Acquisition Process 801 captures or creates the media using example embodiments in FIG. 6 or FIG. 5. Ingest formats are created in Content Preparation Process 802 and then are transmitted to network media distribution system using Transmission Process 803. Gateways 804 may serve customer premise equipment to provide network access to various client end-points for the network. Set Top Boxes 805 may also serve as customer premise equipment to provide access to aggregated content by the network service provider. Radio Demodulators 806 may serve as mobile network access points for mobile devices, e.g. as shown with Mobile Handset and Display 813. In this particular embodiment of system 800, Legacy 2D Televisions 807 are shown to be directly connected to gateways 804 Set Top Box 805, or WiFi Router 808. A computer laptop with a legacy 2D display 809 is illustrated as a client end-point connected to WiFi Router 808. A Head Mounted 2D (raster-based) Display 810 is also connected to router 808. A Lenticular Light Field Display 811 is shown connected to a gateway 804. Display 811 is comprised of local Compute GPUs 811A, Storage Device 811B, and a Visual Presentation Unit 811C that creates multiple views using a ray-based lenticular optical technology. A Holographic Display 812 is shown connected to a set top box 805. Display 812 is comprised of local Compute CPUs 812A, GPUs 812B, Storage Device 812C, and a Fresnal pattern, wave-based holographic Visualization Unit 812D. An Augmented Reality Headset 814 is shown connected to radio demodulator 806. Headset 814 is comprised of GPU 814A, Storage Device 814B, Battery 814C, and volumetric Visual Presentation Component 814D. Dense Light Field Display 815 is shown as connected to a WiFi router 808. The Display 815 is comprised of multiple GPUs 815A, CPUs 815B, Storage Device 815C, Eye Tracking Device 815D, Camera 815E, and a dense ray-based light field panel 815F.

Figure 9:
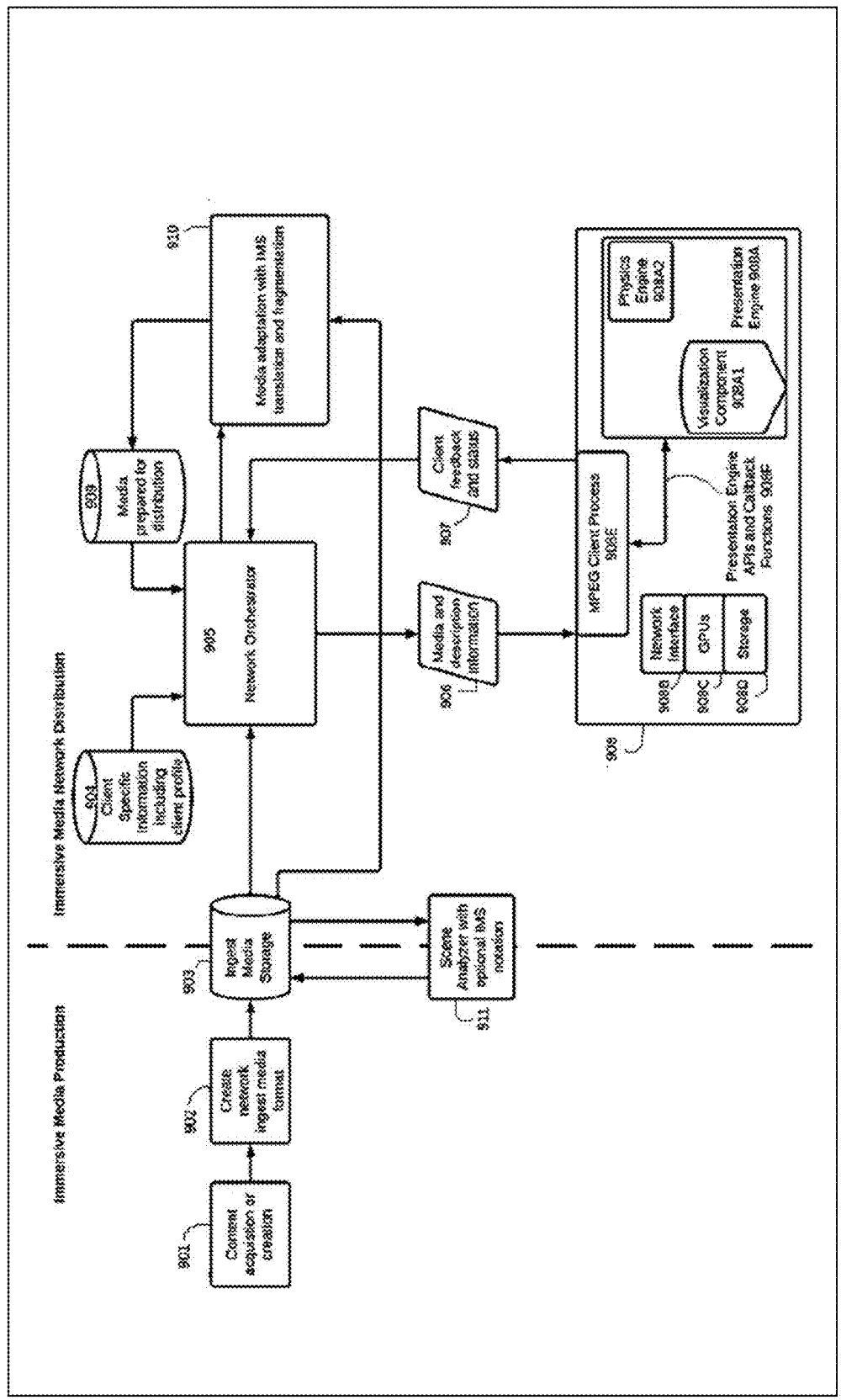
FIG. 9 is a schematic illustration of a network providing adaptation information about the specific media represented in the media ingest format, e.g., prior to the network's process of adapting the media for consumption by a specific immersive media client end-point according to exemplary embodiments. In this illustration, the ingested scene graph is optionally annotated.

FIG. 9 illustrates an embodiment of an Immersive Media Distribution with Scene Analyzer for default viewport Process 900 (which, according to exemplary embodiments, may be an option IMS annotation process) that is capable of serving legacy and heterogeneous immersive media-capable displays as previously depicted in FIG. 8. Content is either created or acquired in Process 901, which is further embodied in FIG. 5 and FIG. 6 for natural and CGI content respectively. Content 901 is then converted into an ingest format using the Create Network Ingest Format Process 902. Process 902 is likewise further embodied in FIG. 5 and FIG. 6 for natural and CGI content respectively. The ingest media is optionally annotated with IMS metadata by Scene Analyzer with Optional IMS Notation 911. The ingest media format is transmitted to the network and stored on Storage Device 903. Optionally, the Storage Device may reside in the immersive media content producer's network, and accessed remotely by the Immersive Media Network Distribution Process (not numbered) as depicted by the dashed line that bisects 903. Client and application specific information is optionally available on a remote Storage Device 904, which may optionally exist remotely in an alternate "cloud" network.

As depicted in FIG. 9, a Network Orchestration Process 905 serves as the primary source and sink of information to execute the major tasks of the distribution network. In this particular embodiment, Process 905 may be implemented in unified format with other components of the network. Nevertheless the tasks depicted by Process 905 in FIG. 9 form essential elements of the disclosed subject matter. Orchestration Process 905 may further employ a bi-directional message protocol with the client to facilitate all processing and distribution of the media in accordance with the characteristics of the client. Furthermore, the bi-directional protocol may be implemented across different delivery channels, i.e., a control plane channel and a data plane channel.

Process 905 receives information about the features and attributes of Client 908, and furthermore collects requirements regarding the application currently running on 908. This information may be obtained from Device 904, or in an alternate embodiment, may be obtained by directly querying the client 908. In the case of a direct query to client 908, a bi-directional protocol is assumed to be present and operational so that the client may communicate directly to the Orchestration Process 905.

Figure 10:
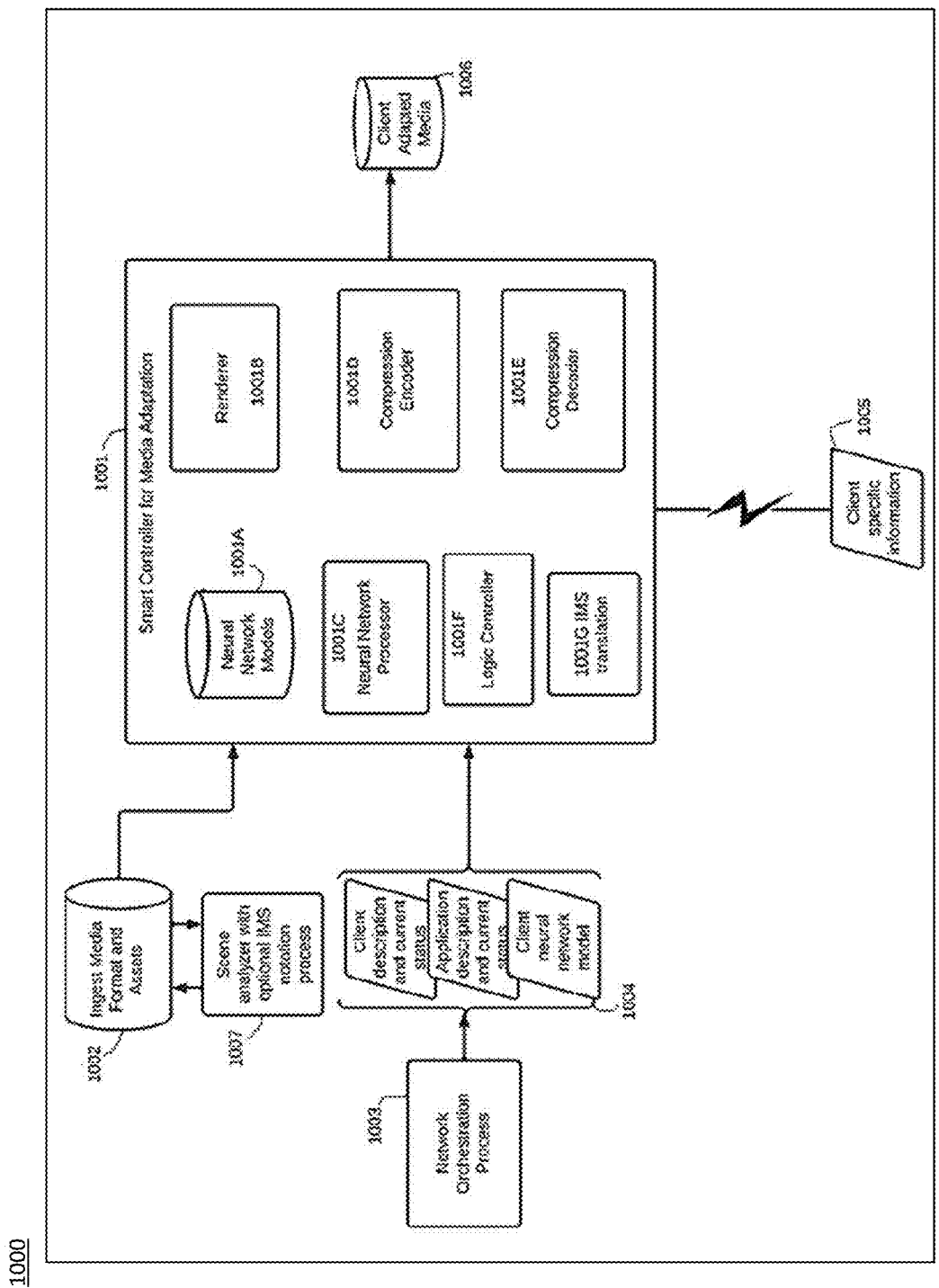
FIG. 10 is a system diagram of a media adaptation process consisting of a media render-converter that converts a source media from its ingest format to a specific format suitable for a specific client end-point according to exemplary embodiments. In this diagram, the scene graph is optionally annotated.

Orchestration Process 905 also initiates and communicates with Media Adaptation and Fragmentation Process 910 which is described in FIG. 10. As ingest media is adapted and fragmented by Process 910, the media is optionally transferred to an *intermedia* storage device depicted as the Media Prepared for Distribution Storage Device 909. As the distribution media is prepared and stored in device 909, Orchestration Process 905 ensures that Immersive Client 908, via its Network Interface 908B, either receives the distribution media and corresponding descriptive information 906 either through a "push" request, or Client 908 itself may initiate a "pull" request of the media 906 from Storage Device 909. Orchestration Process 905 may employ a bi-directional message interface (not shown in FIG. 9) to perform the "push" request or to initiate a "pull" request by the Client 908. Immersive Client 908 may optionally employ GPUs (or CPUs not shown) 908C. The Distribution Format of the media is stored in Client 908's Storage Device or Storage Cache 908D. Finally, Client 908 visually presents the media via its Visualization Component presentation engine 908A.

Throughout the process of streaming the immersive media to Client 908, the Orchestration Process 905 will monitor the status of the Client's progress via Client Progress and Status Feedback Channel 907. The monitoring of status may be performed by means of a bidirectional communication message interface. There is also a presentation engine APIs and callback functions flow from MPEG client process 908E to the presentation engine 908A and its physics engine 908A2 and visualization component 908A1.

FIG. 10 depicts a particular embodiment of a Scene Analyzer for Media Adaptation Process 1000 so that the ingested source media may be appropriately adapted to match the requirements of the Client 908. Media Adaptation Process 1001 is comprised of multiple components that facilitate the adaptation of the ingest media into an appropriate distribution format for Client 908. These components should be regarded as exemplary. In FIG. 10, Adaptation Process 1001 receives input Network Status 1005 to track the current traffic load on the network; Client 908 information including Attributes and Features Description, Application Features and Description as well as Application Current Status, and a Client Neural Network Model (if available) to aid in mapping the geometry of the client's frustum to the interpolation capabilities of the ingest immersive media. Such information may be obtained by means of a bi-directional message interface (not shown in FIG. 10). Adaptation Process 1001 ensures that the adapted output, as it is created, is stored into an Client-Adapted Media Storage Device 1006. Scene Analyzer with Optional IMS Notation Process 1007 is depicted in FIG. 10 as an optional process that may be executed a priori or as part of the network automated process for the distribution of the media.

Adaptation Process 1001 is controlled by Logic Controller 1001F. Adaptation Process 1001 also employs a Renderer 1001B or a Neural Network Processor 1001C to adapt the specific ingest source media to a format that is suitable for the client. Neural Network Processor 1001C uses Neural Network Models in 1001A. Examples of such a Neural Network Processor 1001C include the Deepview neural network model generator as described in MPI and MSI. If the media is in a 2D format, but the client must have a 3D format, then the Neural Network Processor 1001C can invoke a process to use highly correlated images from a 2D video signal to derive a volumetric representation of the scene depicted in the video. An example of a suitable Renderer 1001B could be a modified version of the OTOY Octane renderer which would be modified to interact directly with the Adaptation Process 1001. Adaptation Process 1001 may optionally employ Media Compressors 1001D and Media Decompressors 1001E depending on the need for these tools with respect to the format of the ingest media and the format required by Client 908.

Figure 11:
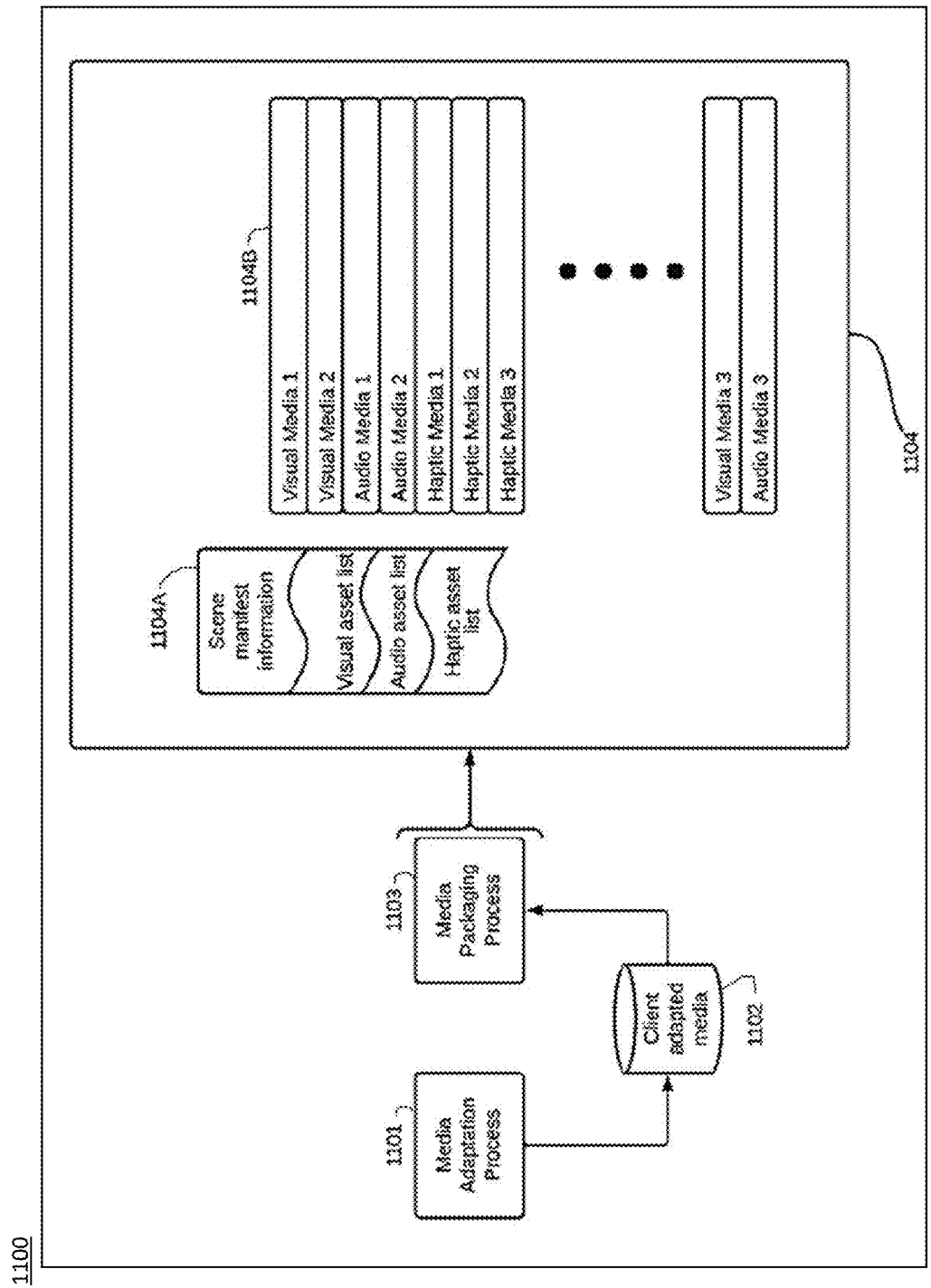
FIG. 11 is a schematic illustration of a network formatting the adapted source media into a data model suitable for representation and streaming according to exemplary embodiments.

FIG. 11 depicts a Distribution Format Creation Process 1100. Adapted Media Packaging Process 1103 packages media from Media Adaptation Process 1101 (depicted as Process 1000 in FIG. 10) now residing on Client Adapted Media Storage Device 1102. The Packaging Process 1103 formats the Adapted Media from Process 1101 into a robust Distribution Format 1104, for example, the exemplary formats shown in FIG. 3 or FIG. 4. Manifest Information 1104A provides Client 908 with a List of Scene Data Assets 1104B that it can expect to receive. List 1104B depicts a list of Visual Assets, Audio Assets, and Haptic Assets, each with their corresponding metadata.

Figure 12:
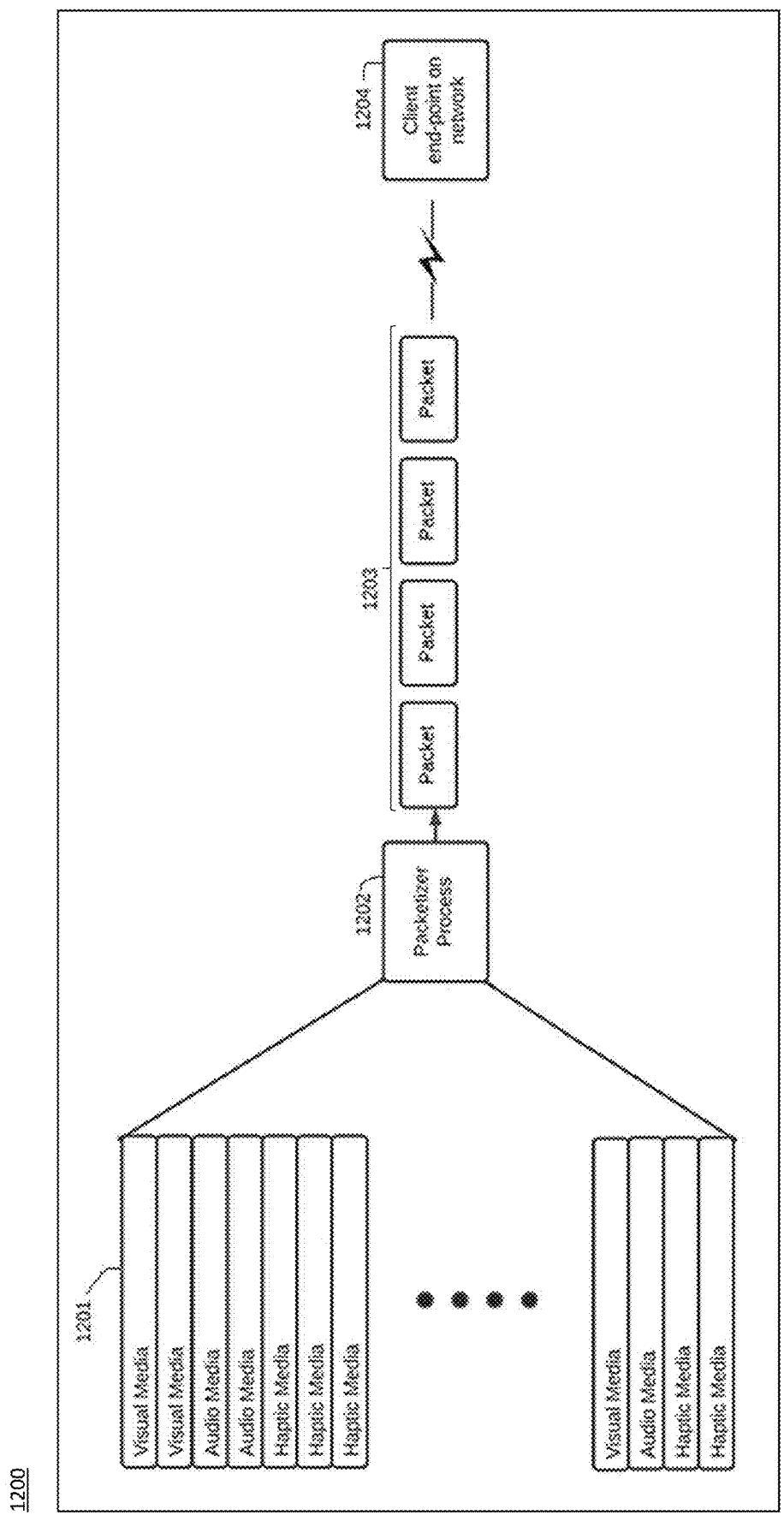
FIG. 12 is a system diagram of a media streaming process that fragments the data model of FIG. 12 into the payloads of network protocol packets according to exemplary embodiments.

FIG. 12 depicts a Packetizer Process System 1200. Packetizer Process 1202 separates the adapted media 1201 into individual Packets 1203 suitable for streaming to Client 908.

Figure 13:
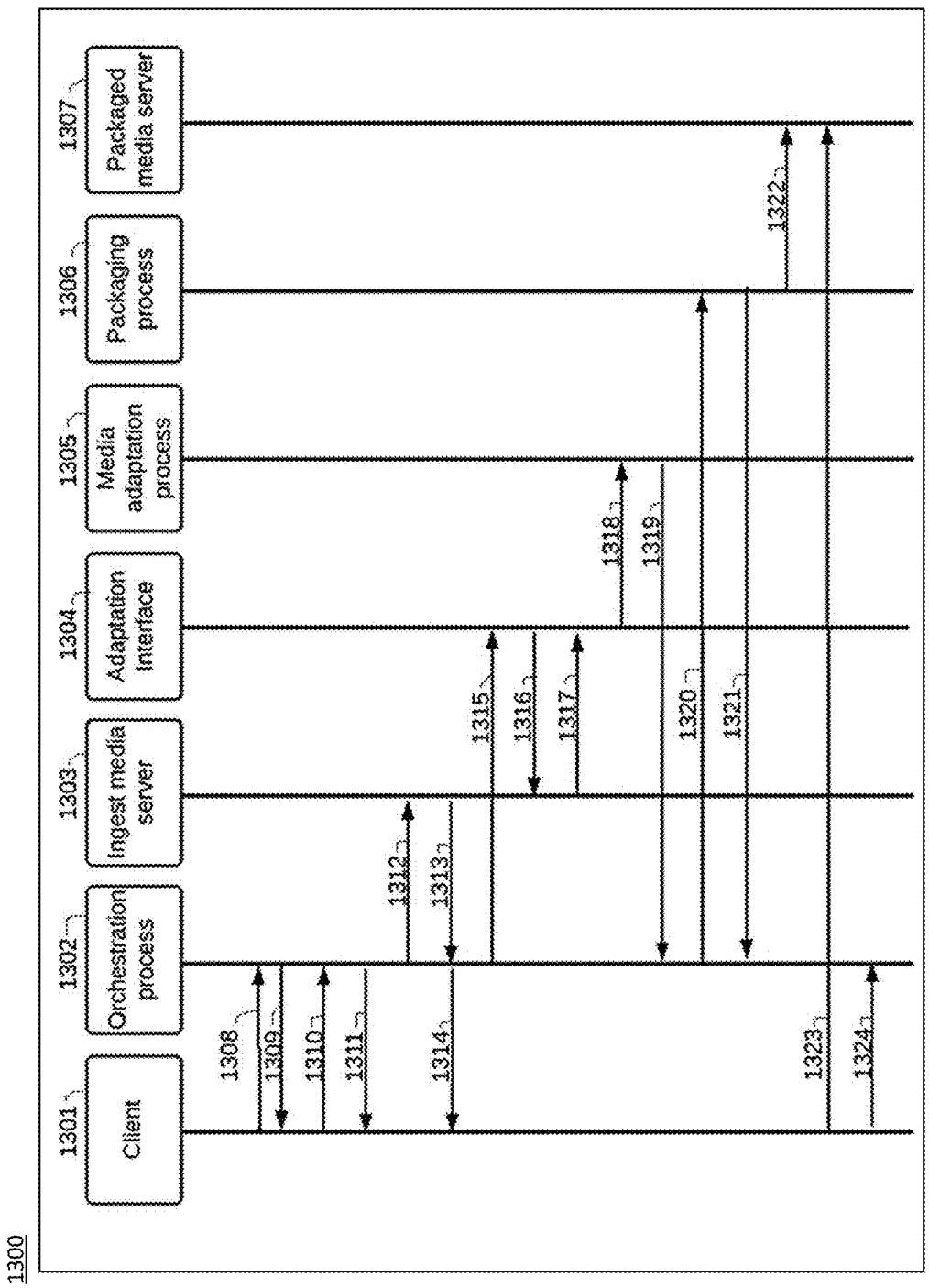
FIG. 13 is a sequence diagram of a network adapting a specific immersive media in an ingest format to a streamable and suitable distribution format for a specific immersive media client end-point according to exemplary embodiments.

The components and communications shown in FIG. 13 for Sequence Diagram 1300 are explained as follows: Client end-point 1301 initiates a Media Request 1308 to Network Distribution Interface 1302. The request 1308 includes information to identify the media that is requested by the client, either by URN or other standard nomenclature. The Network Distribution Interface (also known as Client 1302 responds to request 1308 with Profiles Request 1309, which requests that client 1301 provide information about its currently available resources (including compute, storage, percent battery charged, and other information to characterize the current operating status of the client). Profiles Request 1309 also requests that the client provide one or more neural network models that can be used by the network for neural network inferencing to extract or interpolate the correct media views to match the features of the client's presentation system, if such models are available at the client. Response 1311 from client 1301 to interface 1302 provides a client token, application token, and one or more neural network model tokens (if such neural network model tokens are available at the client). The interface 1302 then provides client 1301 with a Session ID token 1311. Interface 1302 then requests Ingest Media Server 1303 with Ingest Media Request 1312, which includes the URN or other standard name for the media identified in request 1308. Server 1303 replies to request 1312 with response 1313 which includes an ingest media token. Interface 1302 then provides the media token from response 1313 in a call 1314 to client 1301. Interface 1302 then initiates the adaptation process for the requested media in 1308 by providing the Adaptation Interface 1304 with the ingest media token, client token, application token, and neural network model tokens.

Interface 1304 requests access to the ingest media by providing server 1303 with the ingest media token at call 1316 to request access to the ingest media assets. Server 1303 responds to request 1316 with an ingest media access token in response 1317 to interface 1304. Interface 1304 then requests that Media Adaptation Process 1305 adapt the ingest media located at the ingest media access token for the client, application, and neural network inference models corresponding to the session ID token created at 1313. Request 1318 from interface 1304 to process 1305 contains the required tokens and session ID. Process 1305 provides interface 1302 with adapted media access token and session ID in update 1319. Interface 1302 provides Packaging Process 1306 with adapted media access token and session ID in interface call 1320. Packaging process 1306 provides response 1321 to interface 1302 with the Packaged Media Access Token and Session ID in response 1321. Process 1306 provides packaged assets, URNs, and the Packaged Media Access Token for the Session ID to the Packaged Media Server 1307 in response 1322. Client 1301 executes Request 1323 to initiate the streaming of media assets corresponding to the Packaged Media Access Token received in message 1321. The client 1301 executes other requests and provides status updates in message 1324 to the interface 1302.

Figure 14A:
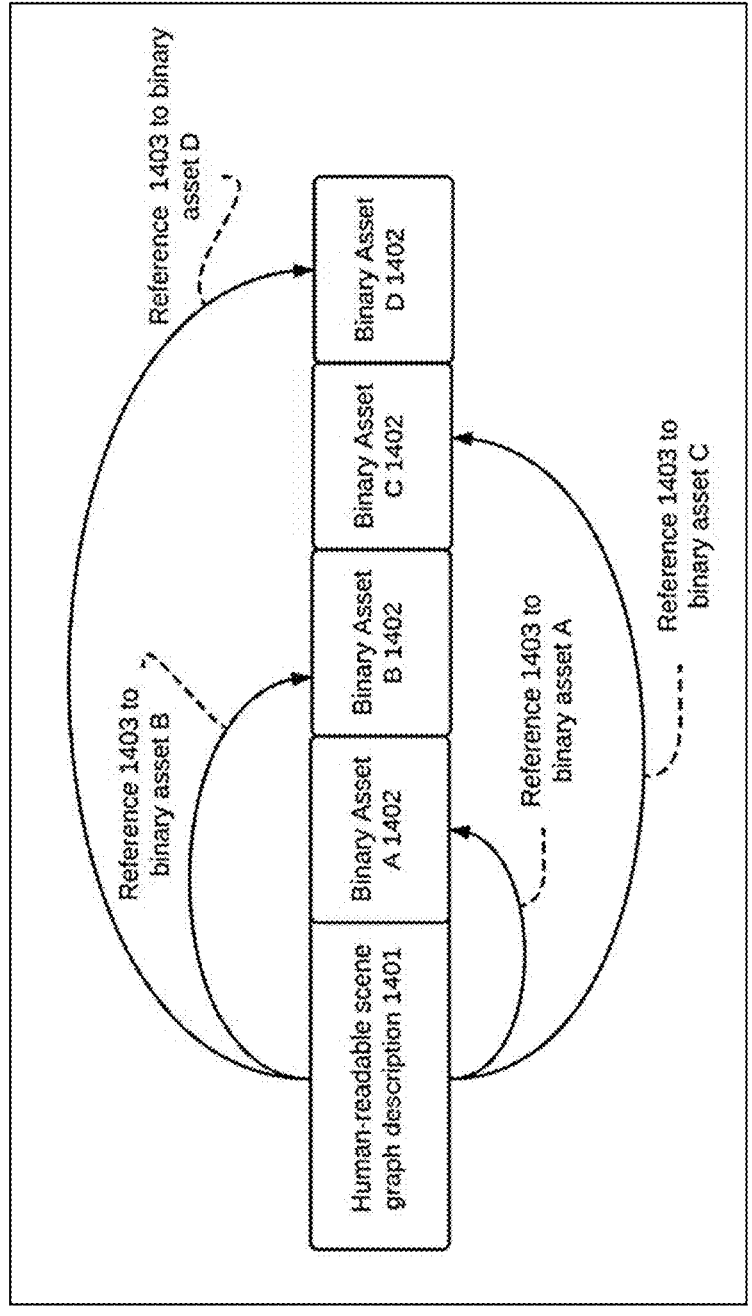
FIG. 14A depicts a common architecture for scene graphs according to exemplary embodiments.

FIG. 14A depicts an exemplary scene graph architecture 1400A. Human-readable scene graph description 1401 serves as the portion of the scene graph where spatial, logical, physical, and temporal aspects of the attached assets are stored. Description 1401 also contains references to binary assets that further comprise the scene. Associated with the Description 1401 are Binary Assets 1402. FIG. 14A illustrates that there are four binary assets for the exemplary graph including: Binary Asset A 1402, Binary Asset B 1402, Binary Asset C 1402, and Binary Asset D 1402. References 1403 from Description 1401 are also illustrated as: Reference 1403 to Binary Asset A, Reference 1403 to Binary Asset B, Reference 1403 to Binary Asset C, and Reference 1403 to Binary Asset D.

Figure 14B:
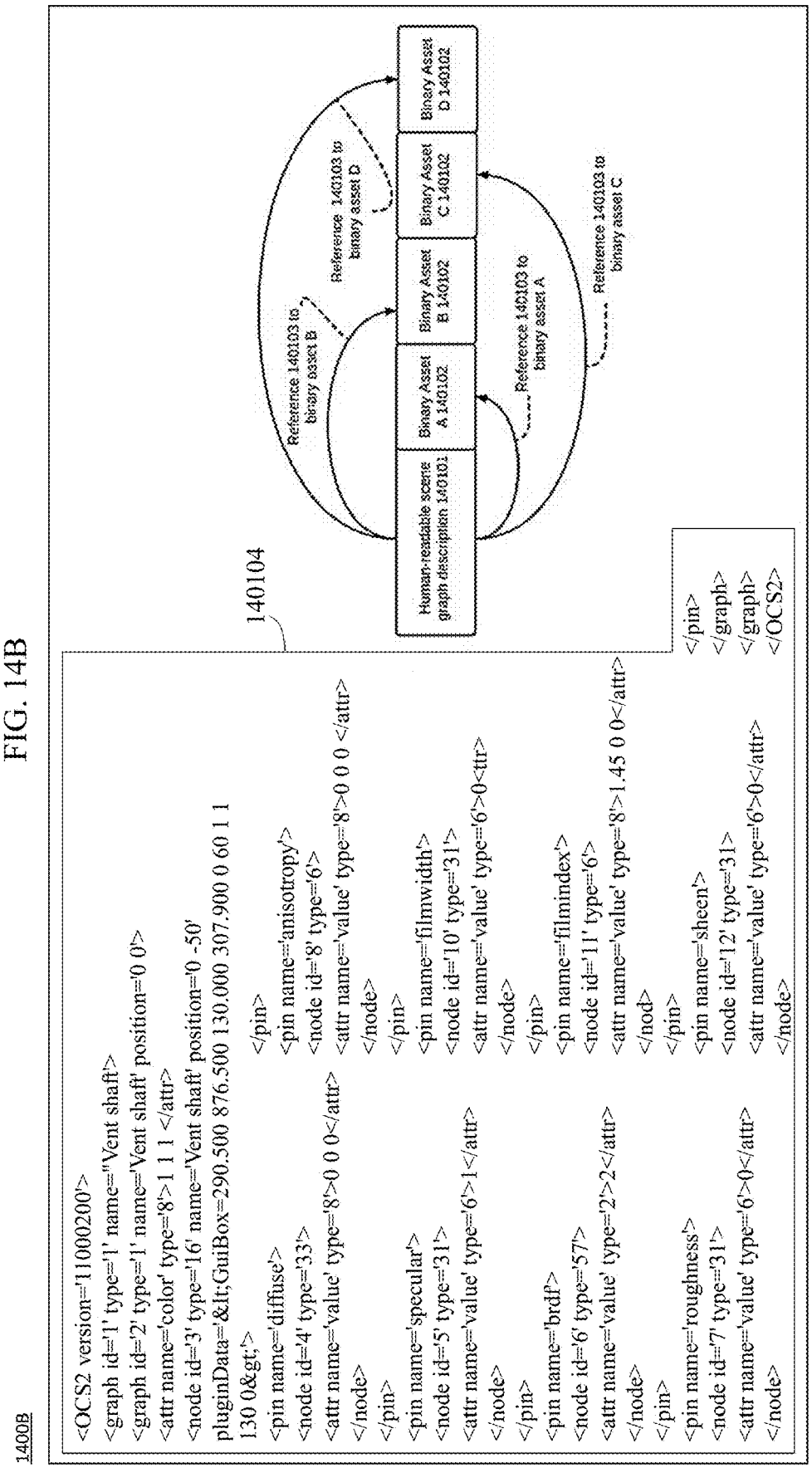
FIG. 14B depicts an expanded example of the architecture depicted in FIG. 14A for the OCS (human-readable portion) of an ITMF scene graph and corresponding assets according to exemplary embodiments.

FIG. 14B depicts an exemplary scene graph architecture 1400B. Human-readable scene graph description 140101 serves as the portion of the scene graph where spatial, logical, physical, and temporal aspects of the attached assets are stored. Description 140101 also contains references to binary assets that further comprise the scene. Associated with the Description 140101 are Binary Assets 140102. FIG. 14 illustrates that there are four binary assets for the exemplary graph including: Binary Asset A 140102, Binary Asset B 140102, Binary Asset C 140102, and Binary Asset D 140102. References 140103 from Description 140101 are also illustrated as: Reference 140103 to Binary Asset A, Reference 140103 to Binary Asset B, Reference 140103 to Binary Asset C, and Reference 140103 to Binary Asset D. Element 140104 represents an example of Description 140101.

Figure 15:
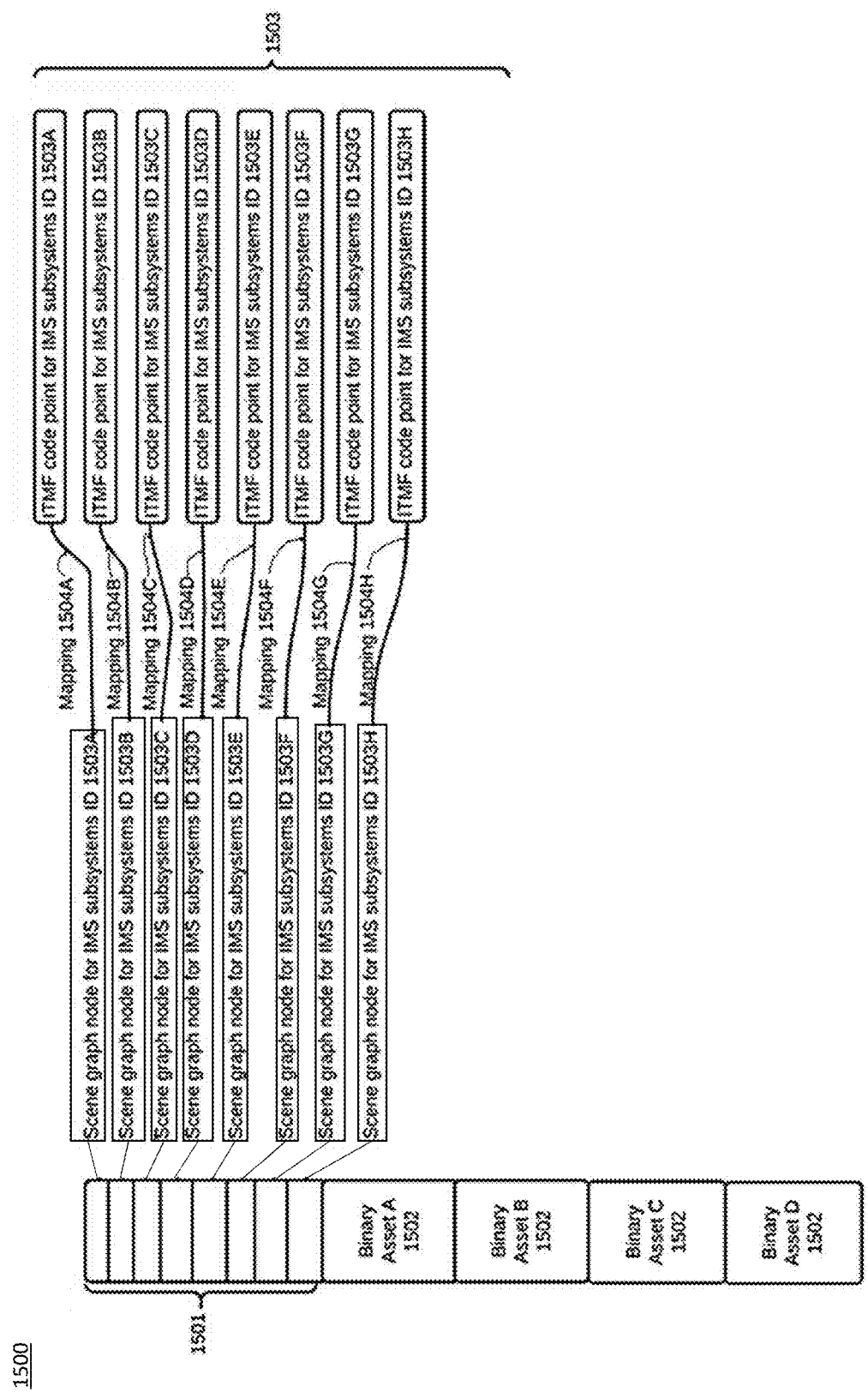
FIG. 15 depicts an example of a scene graph that is annotated where such annotation is placed into the human-readable portion of a scene graph architecture according to exemplary embodiments.

FIG. 15 provides an exemplary annotated scene graph architecture 1500 in which the IMS subsystems metadata 1503? (where ? represents a character in the figure) is written directly into the human-readable portion 1501 of the scene graph architecture 1500. In this example, the IMS subsystems metadata 1503? is comprised of multiple subsystems of metadata: 1503A, 1503B, 1503C, 1503D, 1503E, 1503F, 1503G, and 1503H where each subsystem is associated with its own unique IMS subsystems identifier code point corresponding to the ? depicted for items 1503 in the figure. Mappings 1504? (where ? represents a character in the figure) further provide the additional information of a unique ITMF code point (obtained from the ITMF Suite of Specifications) that fully or partially characterizes the information contained in each section of human-readable portion 1501, such mappings 1504? depicted in the figure including: 1504A, 1504B, 1504C, 1504D, 1504E, 1504F, 1504G, and 1504H. The IMS metadata written into the human-readable portion 1501 is comprised of the information depicted in mappings 1504? as described above. Scene graph architecture 1500 is further comprised of scene assets 1502.

Figure 16:
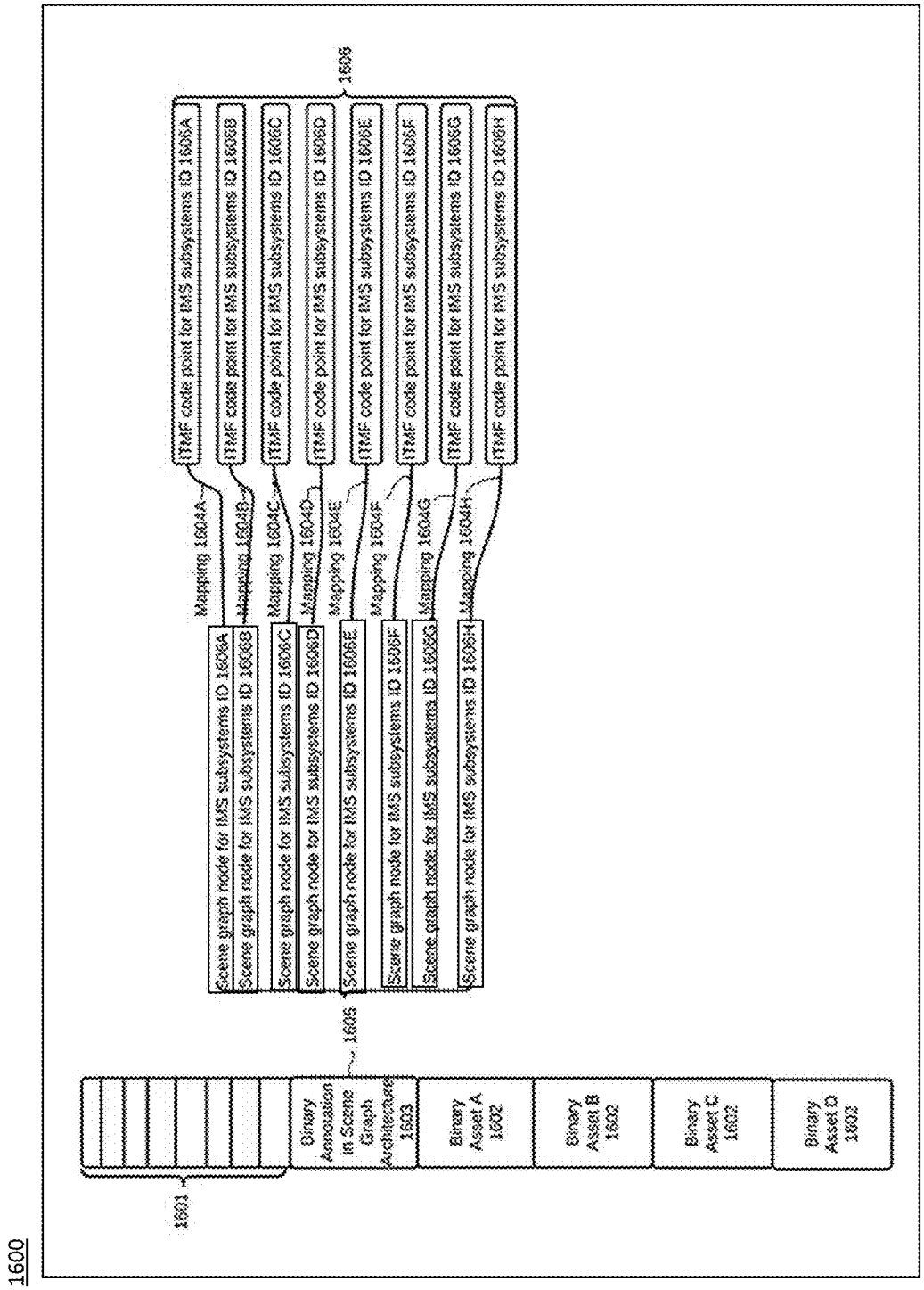
FIG. 16 depicts an example of a scene graph that is annotated where such annotation is placed into a binary (not human-readable) portion of a scene graph architecture according to exemplary embodiments.

FIG. 16 provides an exemplary annotated scene graph architecture 1600 in which the IMS subsystems metadata 1606? (where ? represents a character in the figure) is written directly into a binary portion 1603 of the architecture instead of or in addition to the storage of such metadata in the human-readable portion 1601 (as depicted in FIG. 15) of the scene graph architecture 1600. In this example, the IMS subsystems metadata 1606? is comprised of multiple subsystems of metadata: 1606A, 1606B, 1606C, 1606D, 1606E, 1606F, 1606G, and 1606H where each subsystem is associated with its own unique IMS systems identifier code point corresponding to the ? depicted for items 1606 in the figure. Mappings 1604? (where ? represents a character in the figure) further provide the additional information of a unique ITMF code point (obtained from the ITMF Suite of Specifications) that fully or partially characterizes the information contained in human-readable portion 1601, such mappings 1604? depicted in the figure including: 1604A, 1604B, 1604C, 1604D, 1604E, 1604F, 1604G, and 1604H. The IMS metadata written into binary portion 1603 is comprised of the information depicted in mappings 1604? as described above. Scene graph architecture 1600 is further comprised of scene assets 1602.

Figure 17:
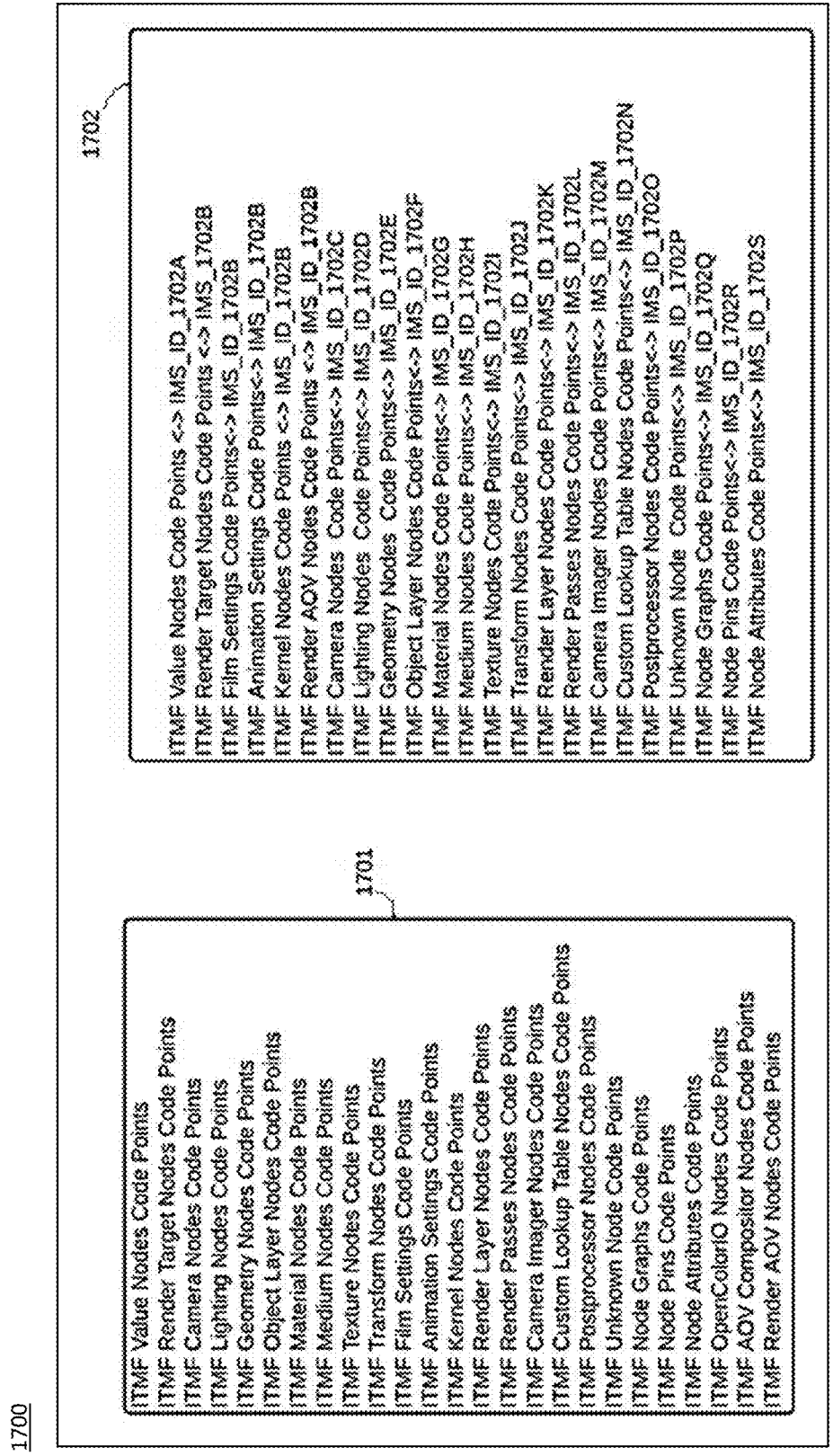
FIG. 17 depicts an example of mapping IMS subsystem identifiers to one or more nodes, pins, or attributes defined in the ITMF according to exemplary embodiments.

FIG. 17 depicts an example mapping 1700 of IMS subsystem identifiers 1702? (where ? represents a character in the figure) to one or more unique code points 1701 from the ITMF Suite of Specifications version 2.0. IMS subsystems identifiers 1702? include: IMS_ID_1702A, IMS_ID_1702B, IMS_ID_1702C, IMS_ID_1702D, IMS_ID_1702E, IMS_ID_1702F, IMS_ID_1702G, IMS_ID_1702H, IMS_ID_1702I, IMS_ID_1702J, IMS_ID_1702K, IMS_ID_1702L, IMS_ID_1702M, IMS_ID_1702N, IMS_ID_1702O, IMS_ID_1702P, IMS_ID_1702Q, IMS_ID_1702R, and IMS_ID_1702S. Mapping 1700 illustrates (for exemplary purposes) that: IMS_ID_1702A is mapped to ITMF code points for Value Nodes; IMS_ID_1702B is mapped to ITMF code points for Render Target Nodes, Film Settings Nodes, Animation Settings Nodes, Kernal Nodes, and Render AOV Nodes; IMS_ID_1702C is mapped to ITMF code points for Render Target Nodes; IMS_ID_1702D is mapped to ITMF code points for Camera Nodes; IMS_ID_1702E is mapped to ITMF code points for Lighting Nodes; IMS_ID_1702F is mapped to ITMF code points for Object Layer Nodes; IMS_ID_1702G is mapped to ITMF code points for Material Nodes; IMS_ID_1702H is mapped to ITMF code points for Medium Nodes; IMS_ID_1702I is mapped to ITMF code points for Texture Nodes; IMS_ID_1702J is mapped to ITMF code points for Transform Nodes; IMS_ID_1702K is mapped to ITMF code points for Render Layer Nodes; IMS_ID_1702L is mapped to ITMF code points for Render Passes Nodes; IMS_ID_1702M is mapped to ITMF code points for Camera Imager Nodes; IMS_ID_1702N is mapped to ITMF code points for Custom Lookup Table Nodes; IMS_ID_1702O is mapped to ITMF code points for Postprocessor Nodes; IMS_ID_1702P is mapped to ITMF code points for Unknown Nodes; IMS_ID_1702Q is mapped to ITMF code points for Node Graph Nodes; IMS_ID_1702R is mapped to ITMF code points for Node Pins; and IMS_ID_1702S is mapped to ITMF code points for Node Attributes.

Figure 18:
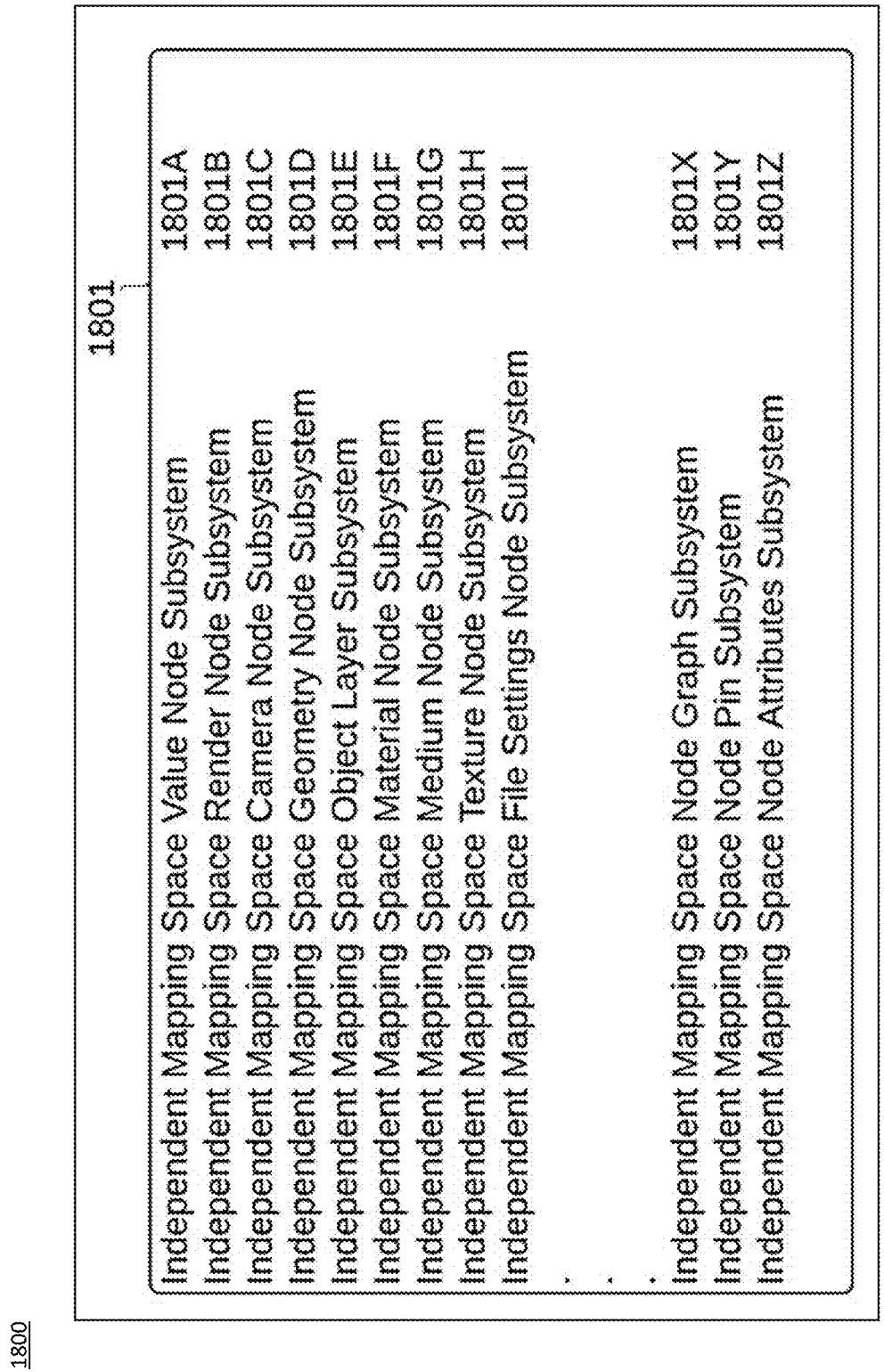
FIG. 18 depicts an example of IMS subsystems to organize IMS metadata according to exemplary embodiments.

FIG. 18 depicts a exemplary system structure 1800 to organize the IMS subsystems described in the disclosed subject matter. In this example, the following IMS subsystems are defined: 1801A is the Independent Mapping Space Value Node Subsystem; 1801B is the Independent Mapping Space Render Node Subsystem; 1801C is the Independent Mapping Space Camera Node Subsystem; 1801D is the Independent Mapping Space Geometry Node Subsystem; 1801E is the Independent Mapping Space Object Layer Subsystem; 1801F is the Independent Mapping Space Material Node Subsystem; 1801G is the Independent Mapping Space Medium Node Subsystem; 1801H is the Independent Mapping Space Texture Node Subsystem; 1801I is the Independent Mapping Space File Settings Node Subsystem; 1801X is the Independent Mapping Space Node Graph Subsystem; 1801Y is the Independent Mapping Space Node Pin Subsystem; and 1801Z is the Independent Mapping Space Node Attributes Subsystem.

Figure 19:
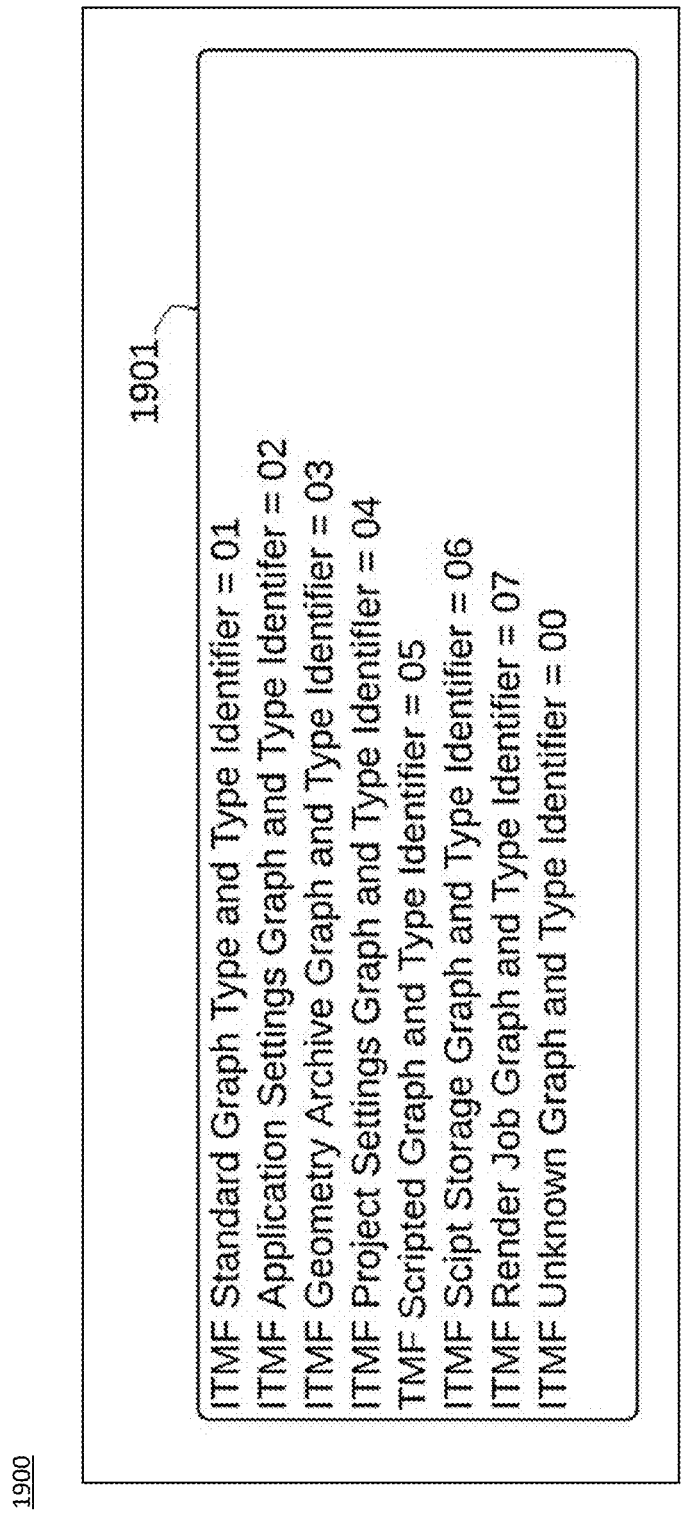
FIG. 19 depicts items of ITMF information that correspond to the node graph subsystem of IMS metadata according to exemplary embodiments.

FIG. 19 depicts an example 1900 of a list of ITMF graph types that form a node graph subsystem 1901 for the disclosed framework of IMS metadata. For the subsystem 1901 the following ITMF graph types and related type identifiers are included: Standard graph, Application settings graph, Geometry Archive Graph, Project Settings Graph, Scripted Graph, Script Storage Graph, and Render Job Graph.

Figure 20:
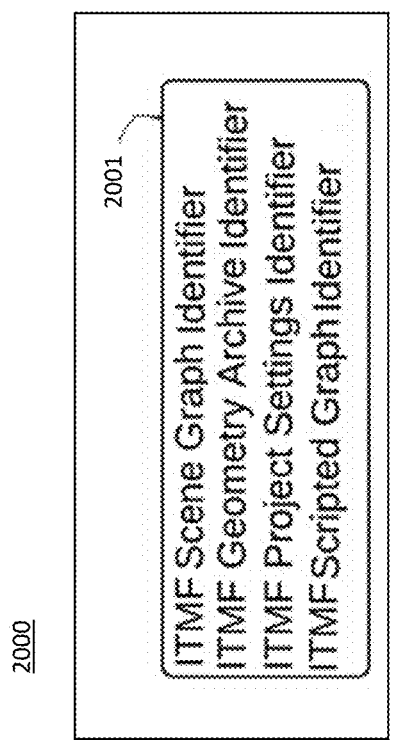
FIG. 20 depicts items of ITMF information that correspond to the node graph subsystem of IMS metadata according to exemplary embodiments.

FIG. 20 represents an example 2000 of node graph types system which may be a subclause specifying the node names, their definitions, and corresponding labels that comprise the Graph Types Nodes System within the Independent Mapping Space according to exemplary embodiments. There may be no code points for the Graph Types Nodes System according to exemplary embodiments.

The features 2001 may be represented also by the following table:

TABLE 1

Nodes and Labels for Graph Types Node System

| Node | Label | Usage |
| --- | --- | --- |
| scene graph | sceneGraph | graph.sceneGraph |
| geometry archive | geometryArchive | graph.geometryArchive |
| project settings | projectSettings | graph.projectSettings |
| scripted graph | scriptedGraph | graph.scriptedGraph |

In the context of this Table 1:
sceneGraph describes an entire scene, consistent with the definition of a scene graph;
geometryArchive describes an individual geometric object;

projectSettings describes a collection of nodes and values to serve as default settings for the graph, e.g., the camera to be used, lighting, and the path to objects that might exist externally to the graph; and scriptedGraph describes a script that can be used to create input to the scene graph, e.g., a compressed video stream that is first reconstructed and then linked to a particular node or object within a scene.

Figure 21:
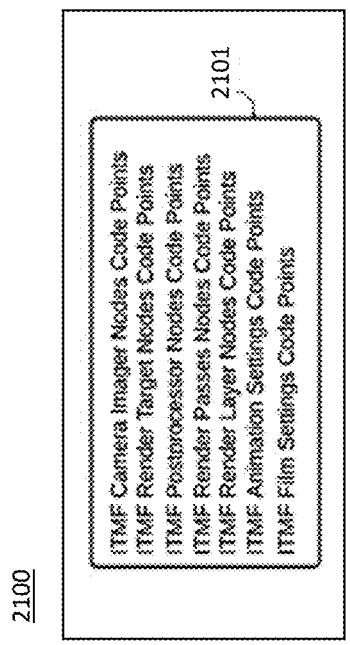
FIG. 21 depicts an example of mapping IMS subsystem identifiers to one or more nodes, pins, or attributes defined in the ITMF according to exemplary embodiments.

FIG. 21 represents an example 2100 of a renderer instruction nodes system which may be a subclause specifying the node names and corresponding labels that comprise the Renderer Instruction Nodes System within the Independent Mapping Space according to exemplary embodiments. Further information for how each renderer instruction node is specified may be obtained from the ITMF Data Encoding Specification according to exemplary embodiments.

TABLE 2

Nodes and Labels for Renderer Instruction Nodes System

| Node | Code Point | Label | Usage |
| --- | --- | --- | --- |
| camera imager | 15 | cameraImager | render.cameraImager |
| render target | 56 | renderTarget | render.renderTarget |
| post processing | 61 | postProcessing | render.postProcessing |
| render passes | 86 | renderPasses | render.renderPasses |
| render layer | 90 | renderLayer | render.renderLayer |
| animation settings | 99 | animationSettings | render.animationSettings |
| film settings | 100 | filmSettings | render.filmSettings |

According to exemplary embodiments, the techniques provided herein describe an embodiment of metadata to create a standardized Independent Mapping Space as described in ISO/IEC 23090 Part 28 to facilitate interchange of 3D scene-based media. Such an embodiment further defines a system for organization of the metadata in which the organization closely aligns to commonly-used methods to organize generic 3D scenes and their corresponding assets. Such a system of IMS metadata is further characterized by code points to describe nodes related to generic parts of commonly deployed scene graphs. Moreover, each part of said IMS metadata system leverages the availability of the ITMF Data Encoding Specification published by the Immersive Digital Experiences Alliance; such specification providing numeric code points for a dense set of descriptors necessarily required by the ITMF Scene Graph and OCS file. Thus each portion of the system for the embodiment described herein leverages the availability of code points specified in the ITMF Data Encoding Specification. Hence, in addition to the ITMF Data Encoding descriptors being directly used by an ITMF scene graph and OCS, such descriptors are likewise used to characterize parts or a plurality of parts of other commonly available scenegraph formats according to the herein disclosed embodiment and system of metadata to define a mapping space such as the one currently in development for the MPEG Independent Mapping Space in ISO/IEC 23090 Part 28.

According to exemplary embodiments, the techniques provided herein describe a framework of metadata to create a standardized Independent Mapping Space as described in ISO/IEC 23090 Part 28 to facilitate interchange of 3D scene-based media. Such a framework further defines a system for organization of the metadata in which the organization closely aligns to commonly-used methods to organize generic 3D scenes and their corresponding assets. In general, the organization system closely follows the organization of code points into subsystems for the ITMF with one exception being the organization of render instructions specifically intended as information for a renderer interface; i.e. there is currently no logical grouping of the renderer interface instructions into a single subsystem of nodes within the ITMF. The lack of such a subsystem of render instructions within the ITMF makes the ITMF organization less efficient for the purposes of asset interchange and asset distribution. Such a subsystem for renderer instructions is disclosed herein to define a complete collection of subsystems in which IMS metadata may be organized.

According to exemplary embodiments, each subsystem of IMS metadata is further characterized by code points to describe nodes related to generic parts of commonly deployed scene graphs. Moreover, each IMS metadata subsystem leverages the availability of the ITMF Data Encoding Specification published by the Immersive Digital Experiences Alliance; such specification providing numeric code points for a dense set of descriptors necessarily required by the ITMF Scene Graph and OCS file. Thus each subsystem forming the complete system for the framework described herein leverages the availability of code points specified in the ITMF Data Encoding Specification.

According to exemplary embodiments, in addition to the ITMF Data Encoding descriptors being directly used by an ITMF scene graph and OCS, such descriptors are likewise used to characterize parts or a plurality of parts of other commonly available scene graph formats according to the herein disclosed framework and system of metadata to define a mapping space such as the one currently in development for the MPEG Independent Mapping Space in ISO/IEC 23090 Part 28.

According to exemplary embodiments, the techniques provided herein describe a framework of metadata to create a standardized Independent Mapping Space as described in ISO/IEC 23090 Part 28 to facilitate interchange of 3D scene-based media. Such a framework further defines a system for organization of the metadata in which such organization closely aligns to commonly-used categories to organize generic 3D scenes and their corresponding assets. In general, the organization system of the disclosed framework closely follows the organization of code points into subsystems for the ITMF with one exception being the organization of node graph information specifically intended to describe how the scene is organized; i.e. there is currently no logical grouping of ITMF nodes nor node code points, to describe how a scene is organized. The lack of such an ITMF subsystem of node graph information within the ITMF makes the ITMF organization less efficient as a sufficient means to organize metadata for the purposes of asset interchange and asset distribution. Hence, such a subsystem for node graph information is disclosed herein to facilitate the definition of a complete collection of subsystems in which IMS metadata may be organized within the disclosed framework.

According to exemplary embodiments, each subsystem of IMS metadata is further characterized by code points to describe nodes related to generic parts of commonly deployed scene graphs. Most of the IMS metadata subsystems may leverage the availability of the ITMF Data Encoding Specification published by the Immersive Digital Experiences Alliance; such specification providing numeric code points for a dense set of descriptors necessarily required by the ITMF Scene Graph and OCS file. An exception to the availability of code points for each subsystem is that there are no explicit ITMF code points to describe the organization of the scene, i.e., a node graph system. In order to include a node graph subsystem within the disclosed framework, a set of descriptors and corresponding code points is defined in the disclosed subject matter to complete the framework of the IMS metadata.

According to exemplary embodiments, each subsystem that comprises the complete system for the framework described herein either leverages the availability of code points specified in the ITMF Data Encoding Specification or has its own set of code points defined specifically for the IMS subsystems; i.e., for those subsystems that do not map directly to existing categories of nodes within the ITMF. The disclosed subject matter therefore specifically defines a node graph subsystem for the IMS framework.

According to exemplary embodiments, there is provided herein a metadata framework to facilitate the preservation of information stored in a scene graph during scene graph translation from one scene graph format to another scene graph format; such framework comprised of organizing the metadata into systems of metadata; each system further corresponding to collections of information common across a plurality of scene graph formats; each system further comprised of numerical values (code points) to more precisely characterize the information for each system.

According to exemplary embodiments, there is provided herein a metadata framework to facilitate the preservation of information stored in a scene graph during scene graph translation from one scene graph format to another scene graph format; such framework comprised of organizing the metadata into subsystems of metadata; each subsystem further corresponding to collections of information common across a plurality of scene graph formats; each subsystem further comprised of numerical values (code points) to more precisely characterize the information for each system; one such subsystem containing information specifically for a renderer interface.

According to exemplary embodiments, there is provided herein a metadata framework to facilitate the preservation of information stored in a scene graph during scene graph translation from one scene graph format to another scene graph format; such framework comprised of organizing the metadata into subsystems of metadata; each subsystem further corresponding to collections of information common across a plurality of scene graph formats; each subsystem further comprised of numerical values (code points) to more precisely characterize the information for each system; one such subsystem containing information specifically describing the type of graph from among a set ITMF graph types.

The code point values may be specified in ITMF.

The metadata may contain graph type identifiers specified in ITMF.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method executed by at least one processor, the method comprising:
   parsing a scene file to extract scene file data;
   sending the scene file data to a converter; and
   translating, by the converter and based on a metadata framework, the scene file data from a first scene graph format to a second scene graph format compatible with a renderer interface,
   the metadata framework comprises an organization of metadata into at least one of systems and subsystems of the systems comprising collections of information common across a plurality of scene graph formats,
   the metadata is specified in an Immersive Technologies Media Format, and
   the organization of the metadata comprises a subclause specifying node names, definitions of the node names, and labels comprising a Graph Types Nodes System within an Independent Mapping Space, and the node names comprise a "scene graph" node, a "geometry archive" node, a "project settings" node, and a "scripted graph" node, and the node names of the subclause of the metadata consist of and are, in the subclause, in order of the "scene graph" node, the "geometry archive" node, the "project settings" node, and the "scripted graph" node.

2. The method according to claim 1, wherein the definitions of the node names comprise a "sceneGraph" definition, describing a scene, a "geometryArchive" definition, describing a geometric object, a "projectSettings", definition describing default settings, and a "scriptedGraph" definition, describing a script.

3. The method according to claim 1, wherein the subclause is absent code points.

4. The method according to claim 1, wherein the organization of the metadata further comprises a second subclause specifying node names and labels comprising a Renderer Instruction Nodes System, other than the Graph Types Nodes System, within the Independent Mapping Space.

5. The method according to claim 4, wherein the node names comprise a "camera imager" node, a "render target" node, a "post processing" node, a "render passes" node, a "render layer" node, an "animation settings" node, and a "film settings" node.

6. The method according to claim 5, wherein the node names of the second subclause of the metadata consist of and are, in the subclause, in order of the "camera imager" node, the "render target" node, the "post processing" node, the "render passes" node, the "render layer" node, the "animation settings" node, and the "film settings" node.

7. The method according to claim 1, wherein the subclause comprises code points.

8. An apparatus comprising:
   at least one memory configured to store computer program code;
   at least one processor configured to access the computer program code and operate as instructed by the computer program code, the computer program code including:
      parsing code configured to cause the at least one processor to parse a scene file to extract scene file data;
      sending code configured to cause the at least one processor to send the scene file data to a converter; and
      translating code configured to cause the at least one processor to translate, by the converter and based on a metadata framework, the scene file data from a first scene graph format to a second scene graph format compatible with a renderer interface,
   the metadata framework comprises an organization of metadata into at least one of systems and subsystems of the systems comprising collections of information common across a plurality of scene graph formats,
   the metadata is specified in an Immersive Technologies Media Format, and
   the organization of the metadata comprises a subclause specifying node names, definitions of the node names, and labels comprising a Graph Types Nodes System within an Independent Mapping Space, the node names comprise a "scene graph" node, a "geometry archive" node, a "project settings" node, and a "scripted graph" node, and the node names of the subclause of the metadata consist of and are, in the subclause, in order of the "scene graph" node, the "geometry archive" node, the "project settings" node, and the "scripted graph" node.

9. The apparatus according to claim 8, wherein the definitions of the node names comprise a "sceneGraph" definition, describing a scene, a "geometryArchive" definition, describing a geometric object, a "projectSettings", definition describing default settings, and a "scriptedGraph" definition, describing a script.

10. The apparatus according to claim 8, wherein the subclause is absent code points.

11. The apparatus according to claim 8, wherein the organization of the metadata comprises a second subclause specifying node names and labels comprising a Renderer Instruction Nodes System, other than the Graph Types Nodes System, within the Independent Mapping Space.

12. The apparatus according to claim 11, wherein the node names comprise a "camera imager" node, a "render target" node, a "post processing" node, a "render passes" node, a "render layer" node, an "animation settings" node, and a "film settings" node.

13. The apparatus according to claim 12, wherein the node names of the subclause of the metadata consist of and are, in the second subclause, in order of the "camera imager" node, the "render target" node, the "post processing" node, the "render passes" node, the "render layer" node, the "animation settings" node, and the "film settings" node.

14. A non-transitory computer readable medium storing a program causing a computer to execute a process, the process comprising:
  parsing a scene file to extract scene file data;
  sending the scene file data to a converter; and
  translating, by the converter and based on a metadata framework, the scene file data from a first scene graph format to a second scene graph format compatible with a renderer interface,
  the metadata framework comprises an organization of metadata into at least one of systems and subsystems of the systems comprising collections of information common across a plurality of scene graph formats,
  the metadata is specified in an Immersive Technologies Media Format, and
  the organization of the metadata comprises a subclause specifying node names, definitions of the node names, and labels comprising a Graph Types Nodes System within an Independent Mapping Space, the node names comprise a "scene graph" node, a "geometry archive" node, a "project settings" node, and a "scripted graph" node, and the node names of the subclause of the metadata consist of and are, in the subclause, in order of the "scene graph" node, the "geometry archive" node, the "project settings" node, and the "scripted graph" node.

* * * * *